(12) United States Patent
Johnson et al.

(10) Patent No.: US 9,675,998 B2
(45) Date of Patent: Jun. 13, 2017

(54) FORMALDEHYDE-FREE FLAME RETARDANT COMPOSITIONS AND THEIR USE FOR MANUFACTURING DURABLE FORMALDEHYDE-FREE FLAME RETARDANT CELLULOSIC MATERIALS

(71) Applicant: Winnitex Limited, Hong Kong (HK)

(72) Inventors: James R. Johnson, McLeansville, NC (US); Kenneth Y. M. Chan, Hong Kong (HK); Charles Wang, Hong Kong (HK)

(73) Assignee: WINNITEX LIMITED, Hong Kong (HK)

( * ) Notice: Subject to any disclaimer, the term of this patent is extended or adjusted under 35 U.S.C. 154(b) by 0 days.

(21) Appl. No.: 13/801,181

(22) Filed: Mar. 13, 2013

(65) Prior Publication Data
US 2013/0280432 A1 Oct. 24, 2013

(30) Foreign Application Priority Data

Apr. 24, 2012 (CN) .......................... 2012 1 0122590
Jun. 4, 2012 (CN) .......................... 2012 1 0185396

(51) Int. Cl.
| | | |
|---|---|---|
| B05D 3/02 | (2006.01) |
| B05D 5/00 | (2006.01) |
| C09K 21/04 | (2006.01) |
| C09K 21/12 | (2006.01) |
| D06M 11/71 | (2006.01) |
| D06M 11/72 | (2006.01) |
| D06M 15/673 | (2006.01) |
| D06M 101/06 | (2006.01) |

(52) U.S. Cl.
CPC ............... B05D 5/00 (2013.01); C09K 21/04 (2013.01); C09K 21/12 (2013.01); D06M 11/71 (2013.01); D06M 11/72 (2013.01); D06M 15/673 (2013.01); D06M 2101/06 (2013.01); D06M 2200/30 (2013.01)

(58) Field of Classification Search
USPC ....................................................... 427/381
See application file for complete search history.

(56) References Cited

U.S. PATENT DOCUMENTS

| | | | | |
|---|---|---|---|---|
| 3,899,483 | A | * | 8/1975 | Le Blanc ........................ 536/84 |
| 4,842,609 | A | * | 6/1989 | Johnson ........................ 8/115.7 |
| 5,151,225 | A | * | 9/1992 | Herndon et al. .............. 252/607 |
| 5,395,305 | A | * | 3/1995 | Koide et al. .................... 602/48 |
| 5,411,213 | A | * | 5/1995 | Just .......................... B02C 4/02 |
| | | | | 241/16 |
| 2004/0121114 | A1 | * | 6/2004 | Piana et al. ..................... 428/85 |
| 2007/0186353 | A1 | * | 8/2007 | Fang ..................... D06M 11/70 |
| | | | | 8/115.51 |

FOREIGN PATENT DOCUMENTS

| | | | | |
|---|---|---|---|---|
| CN | 101560400 A | | 10/2009 | |
| DE | 4317001 A1 | * | 11/1994 | .......... B01F 17/0021 |
| DE | 4337592 A1 | | 5/1995 | |
| EP | 357421 A2 | * | 3/1990 | |
| GB | 1504507 A | * | 3/1978 | |
| GB | 2237756 A | | 5/1991 | |
| JP | 54-46999 A | | 4/1979 | |
| JP | 58-109577 A | | 6/1983 | |
| WO | 8908137 A1 | | 9/1989 | |
| WO | 9013699 A2 | | 11/1990 | |

OTHER PUBLICATIONS

Nam et al. "Effect of Urea Additive on the Thermal Decomposition of Griege Cotton Nonwoven Fabric Treated with Diammonium Phosphate" Polymer Degradation and Stability 96 (2011) 2010-2018 (available online Sep. 5, 2011).*
Isaacs and Lewin, "Flame-Resistant Cellulose Esters," Textile Research Journal, 1974, 44, 700-707.
Yang, "Flame resistant cotton," Handbook of Fire Resistant Textiles, Kilinc Ed., Woodhead Publishing Limited, 2013, 177-220.
Weil and Levchik, "Flame retardants in commercial use or development for textiles," Flame Retardants for Plastics and Textiles, Carl Hanser Verlag GmbH & Co., 2009, pp. 197-225.
Horrocks, "Textiles," Fire Retardant Materials, Horrocks and Price Ed., Crc Press, Cambridge, U.K., 2001, pp. 128-181.

* cited by examiner

*Primary Examiner* — Nathan Empie
(74) *Attorney, Agent, or Firm* — Jones Day

(57) ABSTRACT

Provided herein are formaldehyde-free flame retardant compositions, comprising a flame retardant acid and a fixing agent; and methods of their use for manufacturing durable formaldehyde-free flame retardant cellulosic materials. Also provided herein are durable formaldehyde-free flame retardant cellulosic materials and articles comprising the same.

30 Claims, No Drawings

FORMALDEHYDE-FREE FLAME RETARDANT COMPOSITIONS AND THEIR USE FOR MANUFACTURING DURABLE FORMALDEHYDE-FREE FLAME RETARDANT CELLULOSIC MATERIALS

CROSS REFERENCE TO RELATED APPLICATIONS

This application claims the benefit of the priority of Chinese Patent Application Nos. 201210122590.6, filed Apr. 24, 2012; and 201210185396.2, filed Jun. 4, 2012; the disclosure of each of which is incorporated herein by reference in its entirety

FIELD

Provided herein are formaldehyde-free flame retardant compositions, comprising a flame retardant acid and a fixing agent; and methods of their use for manufacturing durable formaldehyde-free flame retardant cellulosic materials. Also provided herein are durable formaldehyde-free flame retardant cellulosic materials and articles comprising the same.

BACKGROUND

Today there are increasing concerns about the toxicity of chemicals in the environment, including flame retardants. Recently, halogen containing flame retardants have especially come under attack since their presence has been found to be increasing in the environment. For example, several of the polybromo diphenyloxides (PBDO) have already been banned from use.

Formaldehyde is another chemical that poses as a potential problem in the environment. Most durable phosphorus containing flame retardant systems available for cellulosics requires formaldehyde to "insolublize" the flame retardant materials for durability to laundering. Thus, there is a need for formaldehyde-free flame retardant compositions and methods of their use for manufacturing durable formaldehyde-free flame retardant cellulosic materials.

SUMMARY OF THE DISCLOSURE

Provided herein is a formaldehyde-free flame retardant composition, comprising an ammonium salt of a flame retardant acid and a fixing agent. In one embodiment, the flame retardant acid is a phosphorus containing acid, sulfamic acid, or a mixture thereof. In another embodiment, the fixing agent is urea, dicyandiamide, or a mixture thereof.

In one embodiment, provided herein is a formaldehyde-free flame retardant composition, comprising an ammonium salt of a flame retardant acid and a fixing agent; wherein the flame retardant acid is a phosphorus containing acid, sulfamic acid, or a mixture thereof; and wherein the fixing agent is urea, dicyandiamide, or a mixture thereof.

Also provided herein is a formaldehyde-free flame retardant composition, comprising an ammonium of a phosphorus containing acid and a fixing agent.

Additionally, provided herein is a formaldehyde-free flame retardant composition, comprising an ammonium phosphate and a fixing agent.

Furthermore, provided herein is a formaldehyde-free flame retardant composition, comprising an ammonium phosphate and urea.

Provided herein is a method for preparing a durable formaldehyde-free flame retardant cellulosic material, comprising curing a cellulosic material in the presence of an ammonium salt of a flame retardant acid and a fixing reagent.

Provided herein is a method for preparing a durable formaldehyde-free flame retardant cellulosic material, comprising curing a cellulosic material in the presence of an ammonium salt of a phosphorus containing acid and a fixing reagent.

Provided herein is a method for preparing a durable formaldehyde-free flame retardant cellulosic material, comprising curing a cellulosic material in the presence of an ammonium phosphate and a fixing reagent.

Provided herein is a method for preparing a durable formaldehyde-free flame retardant cellulosic material, comprising curing a cellulosic material in the presence of an ammonium phosphate and urea.

Provided herein is a method for preparing a durable formaldehyde-free flame retardant cellulosic material, comprising the steps of:
a) contacting a cellulosic material with a formaldehyde-free flame retardant composition comprising an ammonium salt of a flame retardant acid and a fixing agent to form a wet cellulosic material;
b) drying the wet cellulosic material; and
c) curing the cellulosic material to form the durable formaldehyde-free flame retardant cellulosic material.

Provided herein is a method for preparing a durable formaldehyde-free flame retardant cellulosic material, comprising the steps of:
a) contacting a cellulosic material with a formaldehyde-free flame retardant composition comprising an ammonium salt of a phosphorus containing acid and a fixing agent to form a wet cellulosic material;
b) drying the wet cellulosic material; and
c) curing the cellulosic material to form the durable formaldehyde-free flame retardant cellulosic material.

Provided herein is a method for preparing a durable formaldehyde-free flame retardant cellulosic material, comprising the steps of:
a) contacting a cellulosic material with a formaldehyde-free flame retardant composition comprising an ammonium phosphate and a fixing agent to form a wet cellulosic material;
b) drying the wet cellulosic material; and
c) curing the cellulosic material to form the durable formaldehyde-free flame retardant cellulosic material.

Provided herein is a method for preparing a durable formaldehyde-free flame retardant cellulosic material, comprising the steps of:
a) contacting a cellulosic material with a formaldehyde-free flame retardant composition comprising an ammonium phosphate and urea to form a wet cellulosic material;
b) drying the wet cellulosic material; and
c) curing the cellulosic material to form the durable formaldehyde-free flame retardant cellulosic material.

Provided herein is a durable formaldehyde-free flame retardant cellulosic material, which is prepared by a method comprising curing a cellulosic material in the presence of an ammonium salt of a flame retardant acid and a fixing reagent.

Provided herein is a durable formaldehyde-free flame retardant cellulosic material, which is prepared by a method comprising curing a cellulosic material in the presence of an ammonium salt of a phosphorus containing acid and a fixing reagent.

Provided herein is a durable formaldehyde-free flame retardant cellulosic material, which is prepared by a method comprising curing a cellulosic material in the presence of an ammonium phosphate and a fixing reagent.

Provided herein is a durable formaldehyde-free flame retardant cellulosic material, which is prepared by a method comprising curing a cellulosic material in the presence of an ammonium phosphate and urea.

Provided herein is a durable formaldehyde-free flame retardant cellulosic material, which is prepared by a method comprising the steps of:
a) contacting a cellulosic material with a formaldehyde-free flame retardant composition comprising an ammonium salt of a flame retardant acid and a fixing agent to form a wet cellulosic material;
b) drying the wet cellulosic material; and
c) curing the cellulosic material to form the durable formaldehyde-free flame retardant cellulosic material.

Provided herein is a durable formaldehyde-free flame retardant cellulosic material, which is prepared by a method comprising the steps of:
a) contacting a cellulosic material with a formaldehyde-free flame retardant composition comprising an ammonium salt of a phosphorus containing acid and a fixing agent to form a wet cellulosic material;
b) drying the wet cellulosic material; and
c) curing the cellulosic material to form the durable formaldehyde-free flame retardant cellulosic material.

Provided herein is a durable formaldehyde-free flame retardant cellulosic material, which is prepared by a method comprising the steps of:
a) contacting a cellulosic material with a formaldehyde-free flame retardant composition comprising an ammonium phosphate and a fixing agent to form a wet cellulosic material;
b) drying the wet cellulosic material; and
c) curing the cellulosic material to form the durable formaldehyde-free flame retardant cellulosic material.

Provided herein is a durable formaldehyde-free flame retardant cellulosic material, which is prepared by a method comprising the steps of:
a) contacting a cellulosic material with a formaldehyde-free flame retardant composition comprising an ammonium phosphate and urea to form a wet cellulosic material;
b) drying the wet cellulosic material; and
c) curing the cellulosic material to form the durable formaldehyde-free flame retardant cellulosic material.

Provided herein is a durable formaldehyde-free flame retardant cellulosic material, having a phosphorus content ranging from about 0.1% to about 10% by weight.

Provided herein is an article comprising a durable formaldehyde-free flame retardant cellulosic material, which is prepared by a method comprising curing a cellulosic material in the presence of an ammonium salt of a flame retardant acid and a fixing reagent.

Provided herein is an article comprising a durable formaldehyde-free flame retardant cellulosic material, which is prepared by a method comprising curing a cellulosic material in the presence of an ammonium salt of a phosphorus containing acid and a fixing reagent.

Provided herein is an article comprising a durable formaldehyde-free flame retardant cellulosic material, which is prepared by a method comprising curing a cellulosic material in the presence of an ammonium phosphate and a fixing reagent.

Provided herein is an article comprising a durable formaldehyde-free flame retardant cellulosic material, which is prepared by a method comprising curing a cellulosic material in the presence of an ammonium phosphate and urea.

Provided herein is an article comprising a durable formaldehyde-free flame retardant cellulosic material, which is prepared by a method comprising the steps of:
a) contacting a cellulosic material with a formaldehyde-free flame retardant composition comprising an ammonium salt of a flame retardant acid and a fixing agent to form a wet cellulosic material;
b) drying the wet cellulosic material; and
c) curing the cellulosic material to form the durable formaldehyde-free flame retardant cellulosic material.

Provided herein is an article comprising a durable formaldehyde-free flame retardant cellulosic material, which is prepared by a method comprising the steps of:
a) contacting a cellulosic material with a formaldehyde-free flame retardant composition comprising an ammonium salt of a phosphorus containing acid and a fixing agent to form a wet cellulosic material;
b) drying the wet cellulosic material; and
c) curing the cellulosic material to form the durable formaldehyde-free flame retardant cellulosic material.

Provided herein is an article comprising a durable formaldehyde-free flame retardant cellulosic material, which is prepared by a method comprising the steps of:
a) contacting a cellulosic material with a formaldehyde-free flame retardant composition comprising an ammonium phosphate and a fixing agent to form a wet cellulosic material;
b) drying the wet cellulosic material; and
c) curing the cellulosic material to form the durable formaldehyde-free flame retardant cellulosic material.

Provided herein is an article comprising a durable formaldehyde-free flame retardant cellulosic material, which is prepared by a method comprising the steps of:
a) contacting a cellulosic material with a formaldehyde-free flame retardant composition comprising an ammonium phosphate and urea to form a wet cellulosic material;
b) drying the wet cellulosic material; and
c) curing the cellulosic material to form the durable formaldehyde-free flame retardant cellulosic material.

Provided herein is an article comprising a durable formaldehyde-free flame retardant cellulosic material, having a phosphorus content ranging from about 0.1% to about 10% by weight.

DETAILED DESCRIPTION

To facilitate understanding of the disclosure set forth herein, a number of terms are defined below.

Generally, the nomenclature used herein and the laboratory procedures in inorganic chemistry, organic chemistry, and fiber chemistry described herein are those well known and commonly employed in the art. Unless defined otherwise, all technical and scientific terms used herein generally have the same meaning as commonly understood by one of ordinary skill in the art to which this disclosure belongs.

The term "phosphoric acid" refers to monophosphoric acid or orthophosphoric acid ($H_3PO_4$); polyphosphoric acid, including, but not limited to, pyrophosphoric acid ($H_4P_2O_7$), tripolyphosphoric acid ($H_5P_3O_{10}$), tetrapolyphosphoric acid ($H_6P_4O_{13}$), and trimetaphosphoric acid ($H_3P_3O_9$); phosphoric anhydride ($P_4O_{10}$); and mixtures thereof.

The term "phosphonic acid" refers to an acid having the structure of $R^1PO_3H_2$, wherein $R^1$ is alkyl, alkenyl, alkynyl, cycloalkyl, aryl, aralkyl, heteroaryl, or heterocyclyl, each of which is optionally substituted. Examples of phosphonic acid include, but not limited to, methyl phosphonic acid, phenyl phosphonic acid, and aminotrimethylene phosphonic acid.

The term "an ammonium phosphate" refers to an ammonium salt of a phosphoric acid, including, but not limited to, ammonium salts of orthophosphoric acid, ammonium salts of a polyphosphoric acid, and mixtures thereof. Examples of ammonium phosphates include, but are not limited to, monoammonium orthophosphate ($NH_4H_2PO_4$), diammonium orthophosphate (($NH_4$)$_2HPO_4$), triammonium orthophosphate (($NH_4$)$_3PO_4$), monoammonium pyrophosphate ($NH_4H_3P_2O_7$), diammonium pyrophosphate (($NH_4$)$_2H_2P_2O_7$), triammonium pyrophosphate (($NH_4$)$_3HP_2O_7$), tetraammonium pyrophosphate (($NH_4$)$_4P_2O_7$), monoammonium tripolyphosphate ($NH_4H_4P_3O_{10}$), diammonium tripolyphosphate (($NH_4$)$_2H_3P_3O_{10}$), triammonium tripolyphosphate (($NH_4$)$_3H_2P_3O_{10}$), tetraammonium tripolyphosphate (($NH_4$)$_4HP_3O_{10}$), pentaammonium tripolyphosphate (($NH_4$)$_5P_3O_{10}$), monoammonium tetrapolyphosphate ($NH_4H_5P_4O_{13}$), diammonium tetrapolyphosphate (($NH_4$)$_2H_4P_4O_{13}$), triammonium tetrapolyphosphate (($NH_4$)$_3H_3P_4O_{13}$), tetraammonium tetrapolyphosphate (($NH_4$)$_4H_2P_4O_{13}$), pentaammonium tetrapolyphosphate (($NH_4$)$_5HP_4O_{13}$), hexaammonium tetrapolyphosphate (($NH_4$)$_6P_4O_{13}$), monoammonium trimetaphosphate ($NH_4H_2P_3O_9$), diammonium trimetaphosphate (($NH_4$)$_2HP_3O_9$), triammonium trimetaphosphate (($NH_4$)$_3P_3O_9$), and mixtures thereof.

The term "cellulosic material" refers to a material that comprises cellulose. The term "cellulosic material" as used herein encompasses both the natural and man-made cellulosic materials. Examples of cellulosic materials include, but are not limited to, cotton, flax, jute, hemp, ramie, lyocell, and rayon.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

The term "formaldehyde-free" refers to a material that contains no more than 50 ppm, no more than 20 ppm, no more than 10 ppm, no more than 5 ppm, no more than 2 ppm, or no more than 1 ppm of formaldehyde. In one embodiment, the term "formaldehyde-free" refers to a material that contains no more than 50 ppm of formaldehyde. In another embodiment, the term "formaldehyde-free" refers to a material that contains no more than 20 ppm of formaldehyde. In yet another embodiment, the term "formaldehyde-free" refers to a material that contains no more than 10 ppm of formaldehyde. In yet another embodiment, the term "formaldehyde-free" refers to a material that contains no more than 5 ppm of formaldehyde. In yet another embodiment, the term "formaldehyde-free" refers to a material that contains no more than 2 ppm of formaldehyde. In still another embodiment, the term "formaldehyde-free" refers to a material that contains no more than 1 ppm of formaldehyde. The formaldehyde content can be determined using a conventional technique well known to one of ordinary skill in the art.

Formaldehyde-Free Flame Retardant Compositions

In one embodiment, provided herein is a formaldehyde-free flame retardant composition, comprising an ammonium salt of a flame retardant acid and a fixing agent.

In certain embodiments, the flame retardant acid is a phosphorus containing acid, sulfamic acid, or a mixture thereof. In certain embodiments, the flame retardant acid is a phosphorus containing acid. In certain embodiments, the phosphorus containing acid is a phosphoric acid, a phosphonic acid, or a mixture thereof. In certain embodiments, the phosphorus containing acid is a phosphoric acid. In certain embodiments, the flame retardant acid is a phosphonic acid. In certain embodiments, the phosphonic acid is methyl phosphonic acid, phenyl phosphonic acid, aminotrimethylene phosphonic acid, or a mixture thereof. In certain embodiments, the flame retardant acid is a phosphoric acid, a phosphonic acid, sulfamic acid, or a mixture thereof.

In certain embodiments, the fixing agent is urea, dicyandiamide, cyanamide, or a mixture thereof. In certain embodiments, the fixing agent is urea. In certain embodiments, the fixing agent is dicyandiamide. In certain embodiments, the fixing agent is cyanamide.

In certain embodiments, the ammonium salt of the flame retardant acid is formaldehyde-free. In certain embodiments, the ammonium salt of the flame retardant acid has a formaldehyde content of no greater than about 50 ppm, no greater than about 20 ppm, no greater than about 10 ppm, no greater than about 5 ppm, no greater than about 2 ppm, or no greater than about 1 ppm. In certain embodiments, the ammonium salt of the flame retardant acid has a formaldehyde content of no greater than about 50 ppm. In certain embodiments, the ammonium salt of the flame retardant acid has a formaldehyde content of no greater than about 20 ppm. In certain embodiments, the ammonium salt of the flame retardant acid has a formaldehyde content of no greater than about 10 ppm. In certain embodiments, the ammonium salt of the flame retardant acid has a formaldehyde content of no greater than about 5 ppm. In certain embodiments, the ammonium salt of the flame retardant acid has a formaldehyde content of no greater than about 2 ppm. In certain embodiments, the ammonium salt of the flame retardant acid has a formaldehyde content of no greater than about 1 ppm.

In certain embodiments, the fixing agent is formaldehyde-free. In certain embodiments, the fixing agent has a formaldehyde content of no greater than about 50 ppm, no greater than about 20 ppm, no greater than about 10 ppm, no greater than about 5 ppm, no greater than about 2 ppm, or no greater than about 1 ppm. In certain embodiments, the fixing agent has a formaldehyde content of no greater than about 50 ppm. In certain embodiments, the fixing agent has a formaldehyde content of no greater than about 20 ppm. In certain embodiments, the fixing agent has a formaldehyde content of no greater than about 10 ppm. In certain embodiments, the fixing agent has a formaldehyde content of no greater than about 5 ppm. In certain embodiments, the fixing agent has a formaldehyde content of no greater than about 2 ppm. In certain embodiments, the fixing agent has a formaldehyde content of no greater than about 1 ppm.

In certain embodiments, the formaldehyde-free flame retardant composition has a formaldehyde content of no greater than about 50 ppm, no greater than about 20 ppm, no greater than about 10 ppm, no greater than about 5 ppm, no greater than about 2 ppm, or no greater than about 1 ppm. In certain embodiments, the formaldehyde-free flame retardant composition has a formaldehyde content of no greater than about 50 ppm. In certain embodiments, the formaldehyde-free flame retardant composition has a formaldehyde content of no greater than about 20 ppm. In certain embodiments, the formaldehyde-free flame retardant composition has a formaldehyde content of no greater than about 10 ppm. In certain embodiments, the formaldehyde-free flame retardant composition has a formaldehyde content of no greater than about 5 ppm. In certain embodiments, the formaldehyde-free flame retardant composition has a formaldehyde content of no greater than about 2 ppm. In certain embodiments, the formaldehyde-free flame retardant composition has a formaldehyde content of no greater than about 1 ppm.

In certain embodiments, the formaldehyde-free flame retardant composition comprises from about 5% to about 95% by weight, from about 5% to about 90% by weight, from about 5% to about 80% by weight, from about 5% to about 50% by weight, from about 5% to about 40% by weight, from about 5% to about 30% by weight, from about 5% to about 20% by weight, from about 10% to about 50% by weight, from about 10% to about 40% by weight, from about 10% to about 30% by weight, or from about 10% to about 20% by weight of an ammonium salt of a flame retardant acid. In certain embodiments, the formaldehyde-free flame retardant composition comprises from about 5% to about 95% by weight of an ammonium salt of a flame retardant acid. In certain embodiments, the formaldehyde-free flame retardant composition comprises from about 5% to about 90% by weight of an ammonium salt of a flame retardant acid. In certain embodiments, the formaldehyde-free flame retardant composition comprises from about 5% to about 80% by weight of an ammonium salt of a flame retardant acid. In certain embodiments, the formaldehyde-free flame retardant composition comprises from about 5% to about 50% by weight of an ammonium salt of a flame retardant acid. In certain embodiments, the formaldehyde-free flame retardant composition comprises from about 5% to about 40% by weight of an ammonium salt of a flame retardant acid. In certain embodiments, the formaldehyde-free flame retardant composition comprises from about 5% to about 30% by weight of an ammonium salt of a flame retardant acid. In certain embodiments, the formaldehyde-free flame retardant composition comprises from about 5% to about 20% by weight of an ammonium salt of a flame retardant acid. In certain embodiments, the formaldehyde-free flame retardant composition comprises from about 10% to about 50% by weight of an ammonium salt of a flame retardant acid. In certain embodiments, the formaldehyde-free flame retardant composition comprises from about 10% to about 40% by weight of an ammonium salt of a flame retardant acid. In certain embodiments, the formaldehyde-free flame retardant composition comprises from about 10% to about 30% by weight of an ammonium salt of a flame retardant acid. In certain embodiments, the formaldehyde-free flame retardant composition comprises from about 10% to about 20% by weight of an ammonium salt of a flame retardant acid.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of an ammonium salt of a flame retardant acid.

In certain embodiments, the formaldehyde-free flame retardant composition comprises from about 5% to about 95% by weight, from about 5% to about 90% by weight, from about 5% to about 80% by weight, from about 5% to about 50% by weight, from about 5% to about 40% by weight, from about 5% to about 30% by weight, from about 5% to about 20% by weight, from about 10% to about 50% by weight, from about 10% to about 40% by weight, from about 10% to about 30% by weight, or from about 10% to about 20% by weight of a fixing agent. In certain embodiments, the formaldehyde-free flame retardant composition comprises from about 5% to about 95% by weight of a fixing agent. In certain embodiments, the formaldehyde-free flame retardant composition comprises from about 5% to about 90% by weight of a fixing agent. In certain embodiments, the formaldehyde-free flame retardant composition comprises from about 5% to about 80% by weight of a fixing agent. In certain embodiments, the formaldehyde-free flame retardant composition comprises from about 5% to about 50% by weight of a fixing agent. In certain embodiments, the formaldehyde-free flame retardant composition comprises from about 5% to about 40% by weight of a fixing agent. In certain embodiments, the formaldehyde-free flame retardant composition comprises from about 5% to about 30% by weight of a fixing agent. In certain embodiments, the formaldehyde-free flame retardant composition comprises from about 5% to about 20% by weight of a fixing agent. In certain embodiments, the formaldehyde-free flame retardant composition comprises from about 10% to about 50% by weight of a fixing agent. In certain embodiments, the formaldehyde-free flame retardant composition comprises from about 10% to about 40% by weight of a fixing agent. In certain embodiments, the formaldehyde-free flame retardant composition comprises from about 10% to about 30% by weight of a fixing agent. In certain embodiments, the formaldehyde-free flame retardant composition comprises from about 10% to about 20% by weight of a fixing agent.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of a fixing agent.

In one embodiment, the formaldehyde-free flame retardant composition comprises from about 5% to about 95% by weight of an ammonium salt of an flame retardant acid and from about 95% to about 5% by weight of a fixing agent. In another embodiment, the formaldehyde-free flame retardant composition comprises from about 5% to about 90% by weight of an ammonium salt of an flame retardant acid and from about 90% to about 5% by weight of a fixing agent. In yet another embodiment, the formaldehyde-free flame retardant composition comprises from about 5% to about 80% by weight of an ammonium salt of an flame retardant acid and from about 80% to about 5% by weight of a fixing agent. In yet another embodiment, the formaldehyde-free flame retardant composition comprises from about 5% to about 50% by weight of an ammonium salt of an flame retardant acid and from about 50% to about 5% by weight of a fixing agent.

In one embodiment, the formaldehyde-free flame retardant composition comprises from about 10% to about 95% by weight of an ammonium salt of an flame retardant acid and from about 95% to about 10% by weight of a fixing agent. In another embodiment, the formaldehyde-free flame retardant composition comprises from about 10% to about 90% by weight of an ammonium salt of an flame retardant acid and from about 90% to about 10% by weight of a fixing agent. In yet another embodiment, the formaldehyde-free flame retardant composition comprises from about 10% to about 80% by weight of an ammonium salt of an flame retardant acid and from about 80% to about 10% by weight of a fixing agent. In yet another embodiment, the formaldehyde-free flame retardant composition comprises from about 10% to about 50% by weight of an ammonium salt of an flame retardant acid and from about 50% to about 10% by weight of a fixing agent.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of an ammonium salt of an flame retardant acid; and about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of a fixing agent.

In yet another embodiment, the formaldehyde-free flame retardant composition further comprises water. In certain embodiments, the formaldehyde-free flame retardant composition comprises from about 5% to about 95% by weight, from about 5% to about 90% by weight, from about 5% to about 80% by weight, from about 10% to about 80% by weight, from about 20% to about 80% by weight, or from about 20% to about 70% by weight water. In certain embodiments, the formaldehyde-free flame retardant composition comprises from about 5% to about 95% by weight of water. In certain embodiments, the formaldehyde-free flame retardant composition comprises from about 5% to about 90% by weight of water. In certain embodiments, the formaldehyde-free flame retardant composition comprises from about 5% to about 80% by weight of water. In certain embodiments, the formaldehyde-free flame retardant composition comprises from about 10% to about 80% by weight of water. In certain embodiments, the formaldehyde-free flame retardant composition comprises from about 20% to about 80% by weight of water. In certain embodiments, the formaldehyde-free flame retardant composition comprises from about 20% to about 70% by weight of water.

In certain embodiments, the formaldehyde-free flame retardant composition comprises about 25%, about 30%, about 35%, about 40%, about 45%, about 50%, about 55%, about 60%, about 65%, about 70%, or about 75% by weight of water.

In certain embodiments, the formaldehyde-free flame retardant composition comprises from about 10% to about 50% by weight of an ammonium salt of an flame retardant acid, from about 10% to about 50% by weight of a fixing agent, and from about 20% to 70% by weight of water.

In certain embodiments, the formaldehyde-free flame retardant composition comprises about 40% by weight of an ammonium salt of an flame retardant acid, about 35% by weight of a fixing agent, and about 25% by weight of water.

In certain embodiments, the formaldehyde-free flame retardant composition comprises from about 10% to about 50% by weight of an ammonium salt of an flame retardant acid, from about 10% to about 50% by weight of a fixing agent, from about 20% to 70% by weight of water, and from about 0.1% to about 5% by weight of one or more chemicals selected from dyes, wrinkle resist agents, foaming agents, buffers, pH stabilizers, fixing agents, stain repellants (e.g., fluorocarbons), stain blocking agents, soil repellants, wetting agents, softeners, water repellants, stain release agents, optical brighteners, emulsifiers, surfactants, and mixtures thereof.

In certain embodiments, the formaldehyde-free flame retardant composition comprises from about 10% to about 50% by weight of an ammonium salt of an flame retardant acid, from about 10% to about 50% by weight of a fixing agent, from about 20% to 70% by weight of water, and from about 0.1% to about 5% by weight of a wetting agent.

In one embodiment, the formaldehyde-free flame retardant composition comprises about 15% by weight of an ammonium salt of an flame retardant acid, about 25% by weight of a fixing agent, about 60% by weight of water, and about 0.5% by weight of a wetting agent.

In another embodiment, the formaldehyde-free flame retardant composition comprises about 17.5% by weight of an ammonium salt of an flame retardant acid, about 25% by weight of a fixing agent, about 57.5% by weight of water, and about 0.1% by weight of a wetting agent.

In yet another embodiment, the formaldehyde-free flame retardant composition comprises about 12.5% by weight of an ammonium salt of an flame retardant acid, about 20% by weight of a fixing agent, about 67.5% by weight of water, and about 0.1% by weight of a wetting agent.

In yet another embodiment, the formaldehyde-free flame retardant composition comprises about 12% by weight of an ammonium salt of an flame retardant acid, about 24% by weight of a fixing agent, about 64% by weight of water, and about 0.1% by weight of a wetting agent.

In yet another embodiment, the formaldehyde-free flame retardant composition comprises about 12% by weight of an ammonium salt of an flame retardant acid, about 24% by weight of a fixing agent, about 68% by weight of water, and about 0.1% by weight of a wetting agent.

In still another embodiment, the formaldehyde-free flame retardant composition comprises about 15% by weight of an ammonium salt of an flame retardant acid, about 30% by weight of a fixing agent, about 6% by weight of dicyandiamide, about 50% by weight of water, and about 0.5% by weight of a wetting agent.

In certain embodiments, the molar ratio of the fixing agent to the ammonium salt of a flame retardant acid is no less than about 1.1, no less than about 1.2, no less than about 1.3, no less than about 1.4, no less than about 1.5, no less than about 1.6, no less than about 1.7, no less than about 1.8, no less than about 1.9, or no less than about 2. In certain embodiments, the molar ratio of the fixing agent to the ammonium salt of a flame retardant acid is ranging from about 1 to about 20, from about 1 to about 10, from about 1 to about 5, or from about 1 to about 2.

In yet another embodiment, provided herein is a formaldehyde-free flame retardant composition, comprising an ammonium phosphate and a fixing agent.

In yet another embodiment, provided herein is a formaldehyde-free flame retardant composition, comprising an ammonium phosphate and urea.

In certain embodiments, the ammonium phosphate comprises an ammonium orthophosphate (i.e., an ammonium salt of orthophosphoric acid); an ammonium polyphosphate (i.e., an ammonium salt of a polyphosphoric acid); or a mixture thereof.

In certain embodiments, the ammonium phosphate comprises monoammonium orthophosphate ($NH_4H_2PO_4$), diammonium orthophosphate (($NH_4)_2HPO_4$), triammonium orthophosphate (($NH_4)_3PO_4$), monoammonium pyrophosphate ($NH_4H_3P_2O_7$), diammonium pyrophosphate (($NH_4)_2H_2P_2O_7$), triammonium pyrophosphate (($NH_4)_3HP_2O_7$), tetraammonium pyrophosphate (($NH_4)_4P_2O_7$), monoammonium tripolyphosphate ($NH_4H_4P_3O_{10}$), diammonium tripolyphosphate (($NH_4)_2H_3P_3O_{10}$), triammonium tripolyphosphate (($NH_4)_3H_2P_3O_{10}$), tetraammonium tripolyphosphate (($NH_4)_4HP_3O_{10}$), pentaammonium tripolyphosphate (($NH_4)_5P_3O_{10}$), monoammonium tetrapolyphosphate ($NH_4H_5P_4O_{13}$), diammonium tetrapolyphosphate (($NH_4)_2H_4P_4O_{13}$), triammonium tetrapolyphosphate (($NH_4)_3H_3P_4O_{13}$), tetraammonium tetrapolyphosphate (($NH_4)_4H_2P_4O_{13}$), pentaammonium tetrapolyphosphate (($NH_4)_5HP_4O_{13}$), hexaammonium tetrapolyphosphate ((NH$_4$)$_6$P$_4$O$_{13}$), monoammonium trimetaphosphate (NH$_4$H$_2$P$_3$O$_9$), diammonium trimetaphosphate ((NH$_4$)$_2$HP$_3$O$_9$), triammonium trimetaphosphate ((NH$_4$)$_3$P$_3$O$_9$), or a mixture thereof.

In certain embodiments, the ammonium phosphate comprises an ammonium orthophosphate. In certain embodiments, the ammonium phosphate comprises monoammonium orthophosphate (NH$_4$H$_2$PO$_4$), diammonium orthophosphate ((NH$_4$)$_2$HPO$_4$), triammonium orthophosphate ((NH$_4$)$_3$PO$_4$), or a mixture thereof. In certain embodiments, the ammonium phosphate comprises monoammonium orthophosphate (NH$_4$H$_2$PO$_4$). In certain embodiments, the ammonium phosphate comprises diammonium orthophosphate ((NH$_4$)$_2$HPO$_4$). In certain embodiments, the ammonium phosphate comprises triammonium orthophosphate ((NH$_4$)$_3$PO$_4$).

In certain embodiments, the ammonium phosphate comprises an ammonium polyphosphate. In certain embodiments, the ammonium phosphate comprises monoammonium pyrophosphate (NH$_4$H$_3$P$_2$O$_7$), diammonium pyrophosphate ((NH$_4$)$_2$H$_2$P$_2$O$_7$), triammonium pyrophosphate ((NH$_4$)$_3$HP$_2$O$_7$), tetraammonium pyrophosphate ((NH$_4$)$_4$P$_2$O$_7$), monoammonium tripolyphosphate (NH$_4$H$_4$P$_3$O$_{10}$), diammonium tripolyphosphate ((NH$_4$)$_2$H$_3$P$_3$O$_{10}$), triammonium tripolyphosphate ((NH$_4$)$_3$H$_2$P$_3$O$_{10}$), tetraammonium tripolyphosphate ((NH$_4$)$_4$HP$_3$O$_{10}$), pentaammonium tripolyphosphate ((NH$_4$)$_5$P$_3$O$_{10}$), monoammonium tetrapolyphosphate (NH$_4$H$_5$P$_4$O$_{13}$), diammonium tetrapolyphosphate ((NH$_4$)$_2$H$_4$P$_4$O$_{13}$), triammonium tetrapolyphosphate ((NH$_4$)$_3$H$_3$P$_4$O$_{13}$), tetraammonium tetrapolyphosphate ((NH$_4$)$_4$H$_2$P$_4$O$_{13}$), pentaammonium tetrapolyphosphate ((NH$_4$)$_5$HP$_4$O$_{13}$), hexaammonium tetrapolyphosphate ((NH$_4$)$_6$P$_4$O$_{13}$), monoammonium trimetaphosphate (NH$_4$H$_2$P$_3$O$_9$), diammonium trimetaphosphate ((NH$_4$)$_2$HP$_3$O$_9$), triammonium trimetaphosphate ((NH$_4$)$_3$P$_3$O$_9$), or a mixture thereof.

In certain embodiments, the ammonium phosphate comprises an ammonium pyrophosphate. In certain embodiments, the ammonium phosphate comprises monoammonium pyrophosphate (NH$_4$H$_3$P$_2$O$_7$), diammonium pyrophosphate ((NH$_4$)$_2$H$_2$P$_2$O$_7$), triammonium pyrophosphate ((NH$_4$)$_3$HP$_2$O$_7$), tetraammonium pyrophosphate ((NH$_4$)$_4$P$_2$O$_7$), or a mixture thereof. In certain embodiments, the ammonium phosphate comprises monoammonium pyrophosphate (NH$_4$H$_3$P$_2$O$_7$). In certain embodiments, the ammonium phosphate comprises diammonium pyrophosphate ((NH$_4$)$_2$H$_2$P$_2$O$_7$). In certain embodiments, the ammonium phosphate comprises triammonium pyrophosphate ((NH$_4$)$_3$HP$_2$O$_7$). In certain embodiments, the ammonium phosphate comprises tetraammonium pyrophosphate ((NH$_4$)$_4$P$_2$O$_7$).

In certain embodiments, the ammonium phosphate comprises an ammonium tripolyphosphate. In certain embodiments, the ammonium phosphate comprises monoammonium tripolyphosphate (NH$_4$H$_4$P$_3$O$_{10}$), diammonium tripolyphosphate ((NH$_4$)$_2$H$_3$P$_3$O$_{10}$), triammonium tripolyphosphate ((NH$_4$)$_3$H$_2$P$_3$O$_{10}$), tetraammonium tripolyphosphate ((NH$_4$)$_4$HP$_3$O$_{10}$), pentaammonium tripolyphosphate ((NH$_4$)$_5$P$_3$O$_{10}$), or a mixture thereof. In certain embodiments, the ammonium phosphate comprises monoammonium tripolyphosphate (NH$_4$H$_4$P$_3$O$_{10}$). In certain embodiments, the ammonium phosphate comprises diammonium tripolyphosphate ((NH$_4$)$_2$H$_3$P$_3$O$_{10}$). In certain embodiments, the ammonium phosphate comprises triammonium tripolyphosphate ((NH$_4$)$_3$H$_2$P$_3$O$_{10}$). In certain embodiments, the ammonium phosphate comprises tetraammonium tripolyphosphate ((NH$_4$)$_4$HP$_3$O$_{10}$). In certain embodiments, the ammonium phosphate comprises pentaammonium tripolyphosphate ((NH$_4$)$_5$P$_3$O$_{10}$).

In certain embodiments, the ammonium phosphate comprises an ammonium tetrapolyphosphate. In certain embodiments, the ammonium phosphate comprises monoammonium tetrapolyphosphate (NH$_4$H$_5$P$_4$O$_{13}$), diammonium tetrapolyphosphate ((NH$_4$)$_2$H$_4$P$_4$O$_{13}$), triammonium tetrapolyphosphate ((NH$_4$)$_3$H$_3$P$_4$O$_{13}$), tetraammonium tetrapolyphosphate ((NH$_4$)$_4$H$_2$P$_4$O$_{13}$), pentaammonium tetrapolyphosphate ((NH$_4$)$_5$HP$_4$O$_{13}$), hexaammonium tetrapolyphosphate ((NH$_4$)$_6$P$_4$O$_{13}$), or a mixture thereof. In certain embodiments, the ammonium phosphate comprises monoammonium tetrapolyphosphate (NH$_4$H$_5$P$_4$O$_{13}$). In certain embodiments, the ammonium phosphate comprises diammonium tetrapolyphosphate ((NH$_4$)$_2$H$_4$P$_4$O$_{13}$). In certain embodiments, the ammonium phosphate comprises triammonium tetrapolyphosphate ((NH$_4$)$_3$H$_3$P$_4$O$_{13}$). In certain embodiments, the ammonium phosphate comprises tetraammonium tetrapolyphosphate ((NH$_4$)$_4$H$_2$P$_4$O$_{13}$). In certain embodiments, the ammonium phosphate comprises pentaammonium tetrapolyphosphate ((NH$_4$)$_5$HP$_4$O$_{13}$). In certain embodiments, the ammonium phosphate comprises hexaammonium tetrapolyphosphate ((NH$_4$)$_6$P$_4$O$_{13}$).

In certain embodiments, the ammonium phosphate comprises an ammonium trimetaphosphate. In certain embodiments, the ammonium phosphate comprises monoammonium trimetaphosphate (NH$_4$H$_2$P$_3$O$_9$), diammonium trimetaphosphate ((NH$_4$)$_2$HP$_3$O$_9$), triammonium trimetaphosphate ((NH$_4$)$_3$P$_3$O$_9$), or a mixture thereof. In certain embodiments, the ammonium phosphate comprises monoammonium trimetaphosphate (NH$_4$H$_2$P$_3$O$_9$). In certain embodiments, the ammonium phosphate comprises diammonium trimetaphosphate ((NH$_4$)$_2$HP$_3$O$_9$). In certain embodiments, the ammonium phosphate comprises triammonium trimetaphosphate ((NH$_4$)$_3$P$_3$O$_9$).

In certain embodiments, the ammonium phosphate is an ammonium orthophosphate (i.e., an ammonium salt of orthophosphoric acid); an ammonium polyphosphate (i.e., an ammonium salt of a polyphosphoric acid); or a mixture thereof.

In certain embodiments, the ammonium phosphate is monoammonium orthophosphate (NH$_4$H$_2$PO$_4$), diammonium orthophosphate ((NH$_4$)$_2$HPO$_4$), triammonium orthophosphate ((NH$_4$)$_3$PO$_4$), monoammonium pyrophosphate (NH$_4$H$_3$P$_2$O$_7$), diammonium pyrophosphate ((NH$_4$)$_2$H$_2$P$_2$O$_7$), triammonium pyrophosphate ((NH$_4$)$_3$HP$_2$O$_7$), tetraammonium pyrophosphate ((NH$_4$)$_4$P$_2$O$_7$), monoammonium tripolyphosphate (NH$_4$H$_4$P$_3$O$_{10}$), diammonium tripolyphosphate ((NH$_4$)$_2$H$_3$P$_3$O$_{10}$), triammonium tripolyphosphate ((NH$_4$)$_3$H$_2$P$_3$O$_{10}$), tetraammonium tripolyphosphate ((NH$_4$)$_4$HP$_3$O$_{10}$), pentaammonium tripolyphosphate ((NH$_4$)$_5$P$_3$O$_{10}$), monoammonium tetrapolyphosphate (NH$_4$H$_5$P$_4$O$_{13}$), diammonium tetrapolyphosphate ((NH$_4$)$_2$H$_4$P$_4$O$_{13}$), triammonium tetrapolyphosphate ((NH$_4$)$_3$H$_3$P$_4$O$_{13}$), tetraammonium tetrapolyphosphate ((NH$_4$)$_4$H$_2$P$_4$O$_{13}$), pentaammonium tetrapolyphosphate ((NH$_4$)$_5$HP$_4$O$_{13}$), hexaammonium tetrapolyphosphate ((NH$_4$)$_6$P$_4$O$_{13}$), monoammonium trimetaphosphate (NH$_4$H$_2$P$_3$O$_9$), diammonium trimetaphosphate ((NH$_4$)$_2$HP$_3$O$_9$), triammonium trimetaphosphate ((NH$_4$)$_3$P$_3$O$_9$), or a mixture thereof.

In certain embodiments, the ammonium phosphate is an ammonium orthophosphate. In certain embodiments, the ammonium phosphate is monoammonium orthophosphate (NH$_4$H$_2$PO$_4$), diammonium orthophosphate ((NH$_4$)$_2$HPO$_4$), triammonium orthophosphate ((NH$_4$)$_3$PO$_4$), or a mixture thereof. In certain embodiments, the ammonium phosphate is monoammonium orthophosphate ($NH_4H_2PO_4$). In certain embodiments, the ammonium phosphate is diammonium orthophosphate (($NH_4$)$_2HPO_4$). In certain embodiments, the ammonium phosphate is triammonium orthophosphate (($NH_4$)$_3PO_4$).

In certain embodiments, the ammonium phosphate is an ammonium polyphosphate. In certain embodiments, the ammonium phosphate is monoammonium pyrophosphate ($NH_4H_3P_2O_7$), diammonium pyrophosphate (($NH_4$)$_2H_2P_2O_7$), triammonium pyrophosphate (($NH_4$)$_3HP_2O_7$), tetraammonium pyrophosphate (($NH_4$)$_4P_2O_7$), monoammonium tripolyphosphate ($NH_4H_4P_3O_{10}$), diammonium tripolyphosphate (($NH_4$)$_2H_3P_3O_{10}$), triammonium tripolyphosphate (($NH_4$)$_3H_2P_3O_{10}$), tetraammonium tripolyphosphate (($NH_4$)$_4HP_3O_{10}$), pentaammonium tripolyphosphate (($NH_4$)$_5P_3O_{10}$), monoammonium tetrapolyphosphate ($NH_4H_5P_4O_{13}$), diammonium tetrapolyphosphate (($NH_4$)$_2H_4P_4O_{13}$), triammonium tetrapolyphosphate (($NH_4$)$_3H_3P_4O_{13}$), tetraammonium tetrapolyphosphate (($NH_4$)$_4H_2P_4O_{13}$), pentaammonium tetrapolyphosphate (($NH_4$)$_5HP_4O_{13}$), hexaammonium tetrapolyphosphate (($NH_4$)$_6P_4O_{13}$), monoammonium trimetaphosphate ($NH_4H_2P_3O_9$), diammonium trimetaphosphate (($NH_4$)$_2HP_3O_9$), triammonium trimetaphosphate (($NH_4$)$_3P_3O_9$), or a mixture thereof.

In certain embodiments, the ammonium phosphate is an ammonium pyrophosphate. In certain embodiments, the ammonium phosphate is monoammonium pyrophosphate ($NH_4H_3P_2O_7$), diammonium pyrophosphate (($NH_4$)$_2H_2P_2O_7$), triammonium pyrophosphate (($NH_4$)$_3HP_2O_7$), tetraammonium pyrophosphate (($NH_4$)$_4P_2O_7$), or a mixture thereof. In certain embodiments, the ammonium phosphate is monoammonium pyrophosphate ($NH_4H_3P_2O_7$). In certain embodiments, the ammonium phosphate is diammonium pyrophosphate (($NH_4$)$_2H_2P_2O_7$). In certain embodiments, the ammonium phosphate is triammonium pyrophosphate (($NH_4$)$_3HP_2O_7$). In certain embodiments, the ammonium phosphate is tetraammonium pyrophosphate (($NH_4$)$_4P_2O_7$).

In certain embodiments, the ammonium phosphate is an ammonium tripolyphosphate. In certain embodiments, the ammonium phosphate is monoammonium tripolyphosphate ($NH_4H_4P_3O_{10}$), diammonium tripolyphosphate (($NH_4$)$_2H_3P_3O_{10}$), triammonium tripolyphosphate (($NH_4$)$_3H_2P_3O_{10}$), tetraammonium tripolyphosphate (($NH_4$)$_4HP_3O_{10}$), pentaammonium tripolyphosphate (($NH_4$)$_5P_3O_{10}$), or a mixture thereof. In certain embodiments, the ammonium phosphate is monoammonium tripolyphosphate ($NH_4H_4P_3O_{10}$). In certain embodiments, the ammonium phosphate is diammonium tripolyphosphate (($NH_4$)$_2H_3P_3O_{10}$). In certain embodiments, the ammonium phosphate is triammonium tripolyphosphate (($NH_4$)$_3H_2P_3O_{10}$). In certain embodiments, the ammonium phosphate is tetraammonium tripolyphosphate (($NH_4$)$_4HP_3O_{10}$). In certain embodiments, the ammonium phosphate is pentaammonium tripolyphosphate (($NH_4$)$_5P_3O_{10}$).

In certain embodiments, the ammonium phosphate is an ammonium tetrapolyphosphate. In certain embodiments, the ammonium phosphate is monoammonium tetrapolyphosphate ($NH_4H_5P_4O_{13}$), diammonium tetrapolyphosphate (($NH_4$)$_2H_4P_4O_{13}$), triammonium tetrapolyphosphate (($NH_4$)$_3H_3P_4O_{13}$), tetraammonium tetrapolyphosphate (($NH_4$)$_4H_2P_4O_{13}$), pentaammonium tetrapolyphosphate (($NH_4$)$_5HP_4O_{13}$), hexaammonium tetrapolyphosphate (($NH_4$)$_6P_4O_{13}$), or a mixture thereof. In certain embodiments, the ammonium phosphate is monoammonium tetrapolyphosphate ($NH_4H_5P_4O_{13}$). In certain embodiments, the ammonium phosphate is diammonium tetrapolyphosphate (($NH_4$)$_2H_4P_4O_{13}$). In certain embodiments, the ammonium phosphate is triammonium tetrapolyphosphate (($NH_4$)$_3H_3P_4O_{13}$). In certain embodiments, the ammonium phosphate is tetraammonium tetrapolyphosphate (($NH_4$)$_4H_2P_4O_{13}$). In certain embodiments, the ammonium phosphate is pentaammonium tetrapolyphosphate (($NH_4$)$_5HP_4O_{13}$). In certain embodiments, the ammonium phosphate is hexaammonium tetrapolyphosphate (($NH_4$)$_6P_4O_{13}$).

In certain embodiments, the ammonium phosphate is an ammonium trimetaphosphate. In certain embodiments, the ammonium phosphate is monoammonium trimetaphosphate ($NH_4H_2P_3O_9$), diammonium trimetaphosphate (($NH_4$)$_2HP_3O_9$), triammonium trimetaphosphate (($NH_4$)$_3P_3O_9$), or a mixture thereof. In certain embodiments, the ammonium phosphate is monoammonium trimetaphosphate ($NH_4H_2P_3O_9$). In certain embodiments, the ammonium phosphate is diammonium trimetaphosphate (($NH_4$)$_2HP_3O_9$). In certain embodiments, the ammonium phosphate is triammonium trimetaphosphate (($NH_4$)$_3P_3O_9$).

In certain embodiments, the ammonium phosphate is formaldehyde-free. In certain embodiments, the ammonium phosphate has a formaldehyde content of no greater than about 50 ppm, no greater than about 20 ppm, no greater than about 10 ppm, no greater than about 5 ppm, no greater than about 2 ppm, or no greater than about 1 ppm. In certain embodiments, the ammonium phosphate has a formaldehyde content of no greater than about 50 ppm. In certain embodiments, the ammonium phosphate has a formaldehyde content of no greater than about 20 ppm. In certain embodiments, the ammonium phosphate has a formaldehyde content of no greater than about 10 ppm. In certain embodiments, the ammonium phosphate has a formaldehyde content of no greater than about 5 ppm. In certain embodiments, the ammonium phosphate has a formaldehyde content of no greater than about 2 ppm. In certain embodiments, the ammonium phosphate has a formaldehyde content of no greater than about 1 ppm.

In certain embodiments, the urea is formaldehyde-free. In certain embodiments, the urea has a formaldehyde content of no greater than about 50 ppm, no greater than about 20 ppm, no greater than about 10 ppm, no greater than about 5 ppm, no greater than about 2 ppm, or no greater than about 1 ppm. In certain embodiments, the urea has a formaldehyde content of no greater than about 50 ppm. In certain embodiments, the urea has a formaldehyde content of no greater than about 20 ppm. In certain embodiments, the urea has a formaldehyde content of no greater than about 10 ppm. In certain embodiments, the urea has a formaldehyde content of no greater than about 5 ppm. In certain embodiments, the urea has a formaldehyde content of no greater than about 2 ppm. In certain embodiments, the urea has a formaldehyde content of no greater than about 1 ppm.

In certain embodiments, the formaldehyde-free flame retardant composition has a formaldehyde content of no greater than about 50 ppm, no greater than about 20 ppm, no greater than about 10 ppm, no greater than about 5 ppm, no greater than about 2 ppm, or no greater than about 1 ppm. In certain embodiments, the formaldehyde-free flame retardant composition has a formaldehyde content of no greater than about 50 ppm. In certain embodiments, the formaldehyde-free flame retardant composition has a formaldehyde content of no greater than about 20 ppm. In certain embodiments, the formaldehyde-free flame retardant composition has a formaldehyde content of no greater than about 10 ppm. In certain embodiments, the formaldehyde-free flame retardant composition has a formaldehyde content of no greater than about 5 ppm. In certain embodiments, the formaldehyde-free flame retardant composition has a formaldehyde content of no greater than about 2 ppm. In certain embodiments, the formaldehyde-free flame retardant composition has a formaldehyde content of no greater than about 1 ppm.

In certain embodiments, the formaldehyde-free flame retardant composition comprises from about 5% to about 95% by weight, from about 5% to about 90% by weight, from about 5% to about 80% by weight, from about 5% to about 50% by weight, from about 5% to about 40% by weight, from about 5% to about 30% by weight, from about 5% to about 20% by weight, from about 10% to about 50% by weight, from about 10% to about 40% by weight, from about 10% to about 30% by weight, or from about 10% to about 20% by weight of an ammonium phosphate. In certain embodiments, the formaldehyde-free flame retardant composition comprises from about 5% to about 95% by weight of an ammonium phosphate. In certain embodiments, the formaldehyde-free flame retardant composition comprises from about 5% to about 90% by weight of an ammonium phosphate. In certain embodiments, the formaldehyde-free flame retardant composition comprises from about 5% to about 80% by weight of an ammonium phosphate. In certain embodiments, the formaldehyde-free flame retardant composition comprises from about 5% to about 50% by weight of an ammonium phosphate. In certain embodiments, the formaldehyde-free flame retardant composition comprises from about 5% to about 40% by weight of an ammonium phosphate. In certain embodiments, the formaldehyde-free flame retardant composition comprises from about 5% to about 30% by weight of an ammonium phosphate. In certain embodiments, the formaldehyde-free flame retardant composition comprises from about 5% to about 20% by weight of an ammonium phosphate. In certain embodiments, the formaldehyde-free flame retardant composition comprises from about 10% to about 50% by weight of an ammonium phosphate. In certain embodiments, the formaldehyde-free flame retardant composition comprises from about 10% to about 40% by weight of an ammonium phosphate. In certain embodiments, the formaldehyde-free flame retardant composition comprises from about 10% to about 30% by weight of an ammonium phosphate. In certain embodiments, the formaldehyde-free flame retardant composition comprises from about 10% to about 20% by weight of an ammonium phosphate.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of an ammonium phosphate.

In certain embodiments, the formaldehyde-free flame retardant composition comprises from about 5% to about 95% by weight, from about 5% to about 90% by weight, from about 5% to about 80% by weight, from about 5% to about 50% by weight, from about 5% to about 40% by weight, from about 5% to about 30% by weight, from about 5% to about 20% by weight, from about 10% to about 50% by weight, from about 10% to about 40% by weight, from about 10% to about 30% by weight, or from about 10% to about 20% by weight of diammonium phosphate, which is also known as diammonium orthophosphate $((NH_4)_2HPO_4)$. In certain embodiments, the formaldehyde-free flame retardant composition comprises from about 5% to about 95% by weight of diammonium phosphate. In certain embodiments, the formaldehyde-free flame retardant composition comprises from about 5% to about 90% by weight of diammonium phosphate. In certain embodiments, the formaldehyde-free flame retardant composition comprises from about 5% to about 80% by weight of diammonium phosphate. In certain embodiments, the formaldehyde-free flame retardant composition comprises from about 5% to about 50% by weight of diammonium phosphate. In certain embodiments, the formaldehyde-free flame retardant composition comprises from about 5% to about 40% by weight of diammonium phosphate. In certain embodiments, the formaldehyde-free flame retardant composition comprises from about 5% to about 30% by weight of diammonium phosphate. In certain embodiments, the formaldehyde-free flame retardant composition comprises from about 5% to about 20% by weight of diammonium phosphate. In certain embodiments, the formaldehyde-free flame retardant composition comprises from about 10% to about 50% by weight of diammonium phosphate. In certain embodiments, the formaldehyde-free flame retardant composition comprises from about 10% to about 40% by weight of diammonium phosphate. In certain embodiments, the formaldehyde-free flame retardant composition comprises from about 10% to about 30% by weight of diammonium phosphate. In certain embodiments, the formaldehyde-free flame retardant composition comprises from about 10% to about 20% by weight of diammonium phosphate.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of diammonium phosphate.

In certain embodiments, the formaldehyde-free flame retardant composition comprises from about 5% to about 95% by weight, from about 5% to about 90% by weight, from about 5% to about 80% by weight, from about 5% to about 50% by weight, from about 5% to about 40% by weight, from about 5% to about 30% by weight, from about 5% to about 20% by weight, from about 10% to about 50% by weight, from about 10% to about 40% by weight, from about 10% to about 30% by weight, or from about 10% to about 20% by weight of an ammonium polyphosphate. In certain embodiments, the formaldehyde-free flame retardant composition comprises from about 5% to about 95% by weight of an ammonium polyphosphate. In certain embodiments, the formaldehyde-free flame retardant composition comprises from about 5% to about 90% by weight of an ammonium polyphosphate. In certain embodiments, the formaldehyde-free flame retardant composition comprises from about 5% to about 80% by weight of an ammonium polyphosphate. In certain embodiments, the formaldehyde-free flame retardant composition comprises from about 5% to about 50% by weight of an ammonium polyphosphate. In certain embodiments, the formaldehyde-free flame retardant composition comprises from about 5% to about 40% by weight of an ammonium polyphosphate. In certain embodiments, the formaldehyde-free flame retardant composition comprises from about 5% to about 30% by weight of an ammonium polyphosphate. In certain embodiments, the formaldehyde-free flame retardant composition comprises from about 5% to about 20% by weight of an ammonium polyphosphate. In certain embodiments, the formaldehyde-free flame retardant composition comprises from about 10% to about 50% by weight of an ammonium polyphosphate. In certain embodiments, the formaldehyde-free flame retardant composition comprises from about 10% to about 40% by weight of an ammonium polyphosphate. In certain embodiments, the formaldehyde-free flame retardant composition comprises from about 10% to about 30% by weight of an ammonium polyphosphate. In certain embodiments, the formaldehyde-free flame retardant composition comprises from about 10% to about 20% by weight of an ammonium polyphosphate.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of an ammonium polyphosphate.

In certain embodiments, the formaldehyde-free flame retardant composition comprises from about 5% to about 95% by weight, from about 5% to about 90% by weight, from about 5% to about 80% by weight, from about 5% to about 50% by weight, from about 5% to about 40% by weight, from about 5% to about 30% by weight, from about 5% to about 20% by weight, from about 10% to about 50% by weight, from about 10% to about 40% by weight, from about 10% to about 30% by weight, or from about 10% to about 20% by weight of urea. In certain embodiments, the formaldehyde-free flame retardant composition comprises from about 5% to about 95% by weight of urea. In certain embodiments, the formaldehyde-free flame retardant composition comprises from about 5% to about 90% by weight of urea. In certain embodiments, the formaldehyde-free flame retardant composition comprises from about 5% to about 80% by weight of urea. In certain embodiments, the formaldehyde-free flame retardant composition comprises from about 5% to about 50% by weight of urea. In certain embodiments, the formaldehyde-free flame retardant composition comprises from about 5% to about 40% by weight of urea. In certain embodiments, the formaldehyde-free flame retardant composition comprises from about 5% to about 30% by weight of urea. In certain embodiments, the formaldehyde-free flame retardant composition comprises from about 5% to about 20% by weight of urea. In certain embodiments, the formaldehyde-free flame retardant composition comprises from about 10% to about 50% by weight of urea. In certain embodiments, the formaldehyde-free flame retardant composition comprises from about 10% to about 40% by weight of urea. In certain embodiments, the formaldehyde-free flame retardant composition comprises from about 10% to about 30% by weight of urea. In certain embodiments, the formaldehyde-free flame retardant composition comprises from about 10% to about 20% by weight of urea.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of urea.

In one embodiment, the formaldehyde-free flame retardant composition comprises from about 5% to about 95% by weight of an ammonium phosphate and from about 95% to about 5% by weight of urea. In another embodiment, the formaldehyde-free flame retardant composition comprises from about 5% to about 90% by weight of an ammonium phosphate and from about 90% to about 5% by weight of urea. In yet another embodiment, the formaldehyde-free flame retardant composition comprises from about 5% to about 80% by weight of an ammonium phosphate and from about 80% to about 5% by weight of urea. In yet another embodiment, the formaldehyde-free flame retardant composition comprises from about 5% to about 50% by weight of an ammonium phosphate and from about 50% to about 5% by weight of urea.

In one embodiment, the formaldehyde-free flame retardant composition comprises from about 10% to about 95% by weight of an ammonium phosphate and from about 95% to about 10% by weight of urea. In another embodiment, the formaldehyde-free flame retardant composition comprises from about 10% to about 90% by weight of an ammonium phosphate and from about 90% to about 10% by weight of urea. In yet another embodiment, the formaldehyde-free flame retardant composition comprises from about 10% to about 80% by weight of an ammonium phosphate and from about 80% to about 10% by weight of urea. In yet another embodiment, the formaldehyde-free flame retardant composition comprises from about 10% to about 50% by weight of an ammonium phosphate and from about 50% to about 10% by weight of urea.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of an ammonium phosphate; and about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of urea.

In one embodiment, the formaldehyde-free flame retardant composition comprises from about 5% to about 95% by weight of diammonium phosphate and from about 95% to about 5% by weight of urea. In another embodiment, the formaldehyde-free flame retardant composition comprises from about 5% to about 90% by weight of diammonium phosphate and from about 90% to about 5% by weight of urea. In yet another embodiment, the formaldehyde-free flame retardant composition comprises from about 5% to about 80% by weight of diammonium phosphate and from about 80% to about 5% by weight of urea. In yet another embodiment, the formaldehyde-free flame retardant composition comprises from about 5% to about 50% by weight of diammonium phosphate and from about 50% to about 5% by weight of urea.

In one embodiment, the formaldehyde-free flame retardant composition comprises from about 10% to about 95% by weight of diammonium phosphate and from about 95% to about 10% by weight of urea. In another embodiment, the formaldehyde-free flame retardant composition comprises from about 10% to about 90% by weight of diammonium phosphate and from about 90% to about 10% by weight of urea. In yet another embodiment, the formaldehyde-free flame retardant composition comprises from about 10% to about 80% by weight of diammonium phosphate and from about 80% to about 10% by weight of urea. In yet another embodiment, the formaldehyde-free flame retardant composition comprises from about 10% to about 50% by weight of diammonium phosphate and from about 50% to about 10% by weight of urea.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of diammonium phosphate; and about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of urea.

In one embodiment, the formaldehyde-free flame retardant composition comprises from about 5% to about 95% by weight of an ammonium polyphosphate and from about 95% to about 5% by weight of urea. In another embodiment, the formaldehyde-free flame retardant composition comprises from about 5% to about 90% by weight of an ammonium polyphosphate and from about 90% to about 5% by weight of urea. In yet another embodiment, the formaldehyde-free flame retardant composition comprises from about 5% to about 80% by weight of an ammonium polyphosphate and from about 80% to about 5% by weight of urea. In yet another embodiment, the formaldehyde-free flame retardant composition comprises from about 5% to about 50% by weight of an ammonium polyphosphate and from about 50% to about 5% by weight of urea.

In one embodiment, the formaldehyde-free flame retardant composition comprises from about 10% to about 95% by weight of an ammonium polyphosphate and from about 95% to about 10% by weight of urea. In another embodiment, the formaldehyde-free flame retardant composition comprises from about 10% to about 90% by weight of an ammonium polyphosphate and from about 90% to about 10% by weight of urea. In yet another embodiment, the formaldehyde-free flame retardant composition comprises from about 10% to about 80% by weight of an ammonium polyphosphate and from about 80% to about 10% by weight of urea. In yet another embodiment, the formaldehyde-free flame retardant composition comprises from about 10% to about 50% by weight of an ammonium polyphosphate and from about 50% to about 10% by weight of urea.

In certain embodiments, the formaldehyde-free flame retardant composition comprises about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of an ammonium polyphosphate; and about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of urea.

In yet another embodiment, the formaldehyde-free flame retardant composition further comprises water. In certain embodiments, the formaldehyde-free flame retardant composition comprises from about 5% to about 95% by weight, from about 5% to about 90% by weight, from about 5% to about 80% by weight, from about 10% to about 80% by weight, from about 20% to about 80% by weight, or from about 20% to about 70% by weight water. In certain embodiments, the formaldehyde-free flame retardant composition comprises from about 5% to about 95% by weight of water. In certain embodiments, the formaldehyde-free flame retardant composition comprises from about 5% to about 90% by weight of water. In certain embodiments, the formaldehyde-free flame retardant composition comprises from about 5% to about 80% by weight of water. In certain embodiments, the formaldehyde-free flame retardant composition comprises from about 10% to about 80% by weight of water. In certain embodiments, the formaldehyde-free flame retardant composition comprises from about 20% to about 80% by weight of water. In certain embodiments, the formaldehyde-free flame retardant composition comprises from about 20% to about 70% by weight of water.

In certain embodiments, the formaldehyde-free flame retardant composition comprises about 25%, about 30%, about 35%, about 40%, about 45%, about 50%, about 55%, about 60%, about 65%, about 70%, or about 75% by weight of water.

In one embodiment, the formaldehyde-free flame retardant composition comprises from about 10% to about 50% by weight of an ammonium phosphate, from about 10% to about 50% by weight of urea, and from about 20% to 70% by weight of water.

In another embodiment, the formaldehyde-free flame retardant composition comprises from about 10% to about 50% by weight of diammonium phosphate, from about 10% to about 50% by weight of urea, and from about 20% to 70% by weight of water.

In yet another embodiment, the formaldehyde-free flame retardant composition comprises from about 10% to about 50% by weight of an ammonium polyphosphate, from about 10% to about 50% by weight of urea, and from about 20% to 70% by weight of water.

In one embodiment, the formaldehyde-free flame retardant composition comprises about 40% by weight of an ammonium phosphate, about 35% by weight of urea, and about 25% by weight of water.

In one embodiment, the formaldehyde-free flame retardant composition comprises from about 10% to about 50% by weight of an ammonium phosphate, from about 10% to about 50% by weight of urea, from about 20% to 70% by weight of water, and from about 0.1% to about 5% by weight of one or more chemicals selected from dyes, wrinkle resist agents, foaming agents, buffers, pH stabilizers, fixing agents, stain repellants (e.g., fluorocarbons), stain blocking agents, soil repellants, wetting agents, softeners, water repellants, stain release agents, optical brighteners, emulsifiers, surfactants, and mixtures thereof.

In another embodiment, the formaldehyde-free flame retardant composition comprises from about 10% to about 50% by weight of diammonium phosphate, from about 10% to about 50% by weight of urea, from about 20% to 70% by weight of water, and from about 0.1% to about 5% by weight of one or more chemicals selected from dyes, wrinkle resist agents, foaming agents, buffers, pH stabilizers, fixing agents, stain repellants (e.g., fluorocarbons), stain blocking agents, soil repellants, wetting agents, softeners, water repellants, stain release agents, optical brighteners, emulsifiers, surfactants, and mixtures thereof.

In yet another embodiment, the formaldehyde-free flame retardant composition comprises from about 10% to about 50% by weight of an ammonium polyphosphate, from about 10% to about 50% by weight of urea, from about 20% to 70% by weight of water, and from about 0.1% to about 5% by weight of one or more chemicals selected from dyes, wrinkle resist agents, foaming agents, buffers, pH stabilizers, fixing agents, stain repellants (e.g., fluorocarbons), stain blocking agents, soil repellants, wetting agents, softeners, water repellants, stain release agents, optical brighteners, emulsifiers, surfactants, and mixtures thereof.

In one embodiment, the formaldehyde-free flame retardant composition comprises from about 10% to about 50% by weight of an ammonium phosphate, from about 10% to about 50% by weight of urea, from about 20% to 70% by weight of water, and from about 0.1% to about 5% by weight of a wetting agent.

In another embodiment, the formaldehyde-free flame retardant composition comprises from about 10% to about 50% by weight of diammonium phosphate, from about 10% to about 50% by weight of urea, from about 20% to 70% by weight of water, and from about 0.1% to about 5% by weight of a wetting agent.

In yet another embodiment, the formaldehyde-free flame retardant composition comprises from about 10% to about 50% by weight of an ammonium polyphosphate, from about 10% to about 50% by weight of urea, from about 20% to 70% by weight of water, and from about 0.1% to about 5% by weight of a wetting agent.

In one embodiment, the formaldehyde-free flame retardant composition comprises about 15% by weight of an ammonium phosphate, about 25% by weight of urea, about 60% by weight of water, and about 0.5% by weight of a wetting agent.

In another embodiment, the formaldehyde-free flame retardant composition comprises about 17.5% by weight of an ammonium phosphate, about 25% by weight of urea, about 57.5% by weight of water, and about 0.1% by weight of a wetting agent.

In yet another embodiment, the formaldehyde-free flame retardant composition comprises about 12.5% by weight of an ammonium phosphate, about 20% by weight of urea, about 67.5% by weight of water, and about 0.1% by weight of a wetting agent.

In yet another embodiment, the formaldehyde-free flame retardant composition comprises about 12% by weight of an ammonium phosphate, about 24% by weight of urea, about 64% by weight of water, and about 0.1% by weight of a wetting agent.

In yet another embodiment, the formaldehyde-free flame retardant composition comprises about 12% by weight of an ammonium phosphate, about 24% by weight of urea, about 68% by weight of water, and about 0.1% by weight of a wetting agent.

In yet another embodiment, the formaldehyde-free flame retardant composition comprises about 15% by weight of an ammonium phosphate, about 30% by weight of urea, about 6% by weight of dicyandiamide, about 50% by weight of water, and about 0.5% by weight of a wetting agent.

In certain embodiments, the molar ratio of urea to the ammonium phosphate is no less than about 1.1, no less than about 1.2, no less than about 1.3, no less than about 1.4, no less than about 1.5, no less than about 1.6, no less than about 1.7, no less than about 1.8, no less than about 1.9, or no less than about 2. In certain embodiments, the molar ratio of urea to the ammonium phosphate is ranging from about 1 to about 20, from about 1 to about 10, from about 1 to about 5, or from about 1 to about 2.

Methods of Preparing Formaldehyde-Free Flame Retardant Cellulosic Materials

In one embodiment, provided herein is a method for preparing a durable formaldehyde-free flame retardant cellulosic material, comprising curing a cellulosic material in the presence of an ammonium salt of a flame retardant acid and a fixing reagent, wherein the flame retardant acid and fixing reagent are each as defined herein.

In another embodiment, provided herein is a method for preparing a durable formaldehyde-free flame retardant cellulosic material, comprising curing a cellulosic material in the presence of an ammonium salt of a phosphorus containing acid and a fixing reagent, wherein the phosphorus containing acid and fixing reagent are each as defined herein.

In yet another embodiment, provided herein is a method for preparing a durable formaldehyde-free flame retardant cellulosic material, comprising curing a cellulosic material in the presence of an ammonium phosphate and a fixing reagent, wherein the ammonium phosphate and fixing reagent are each as defined herein.

In yet another embodiment, provided herein is a method for preparing a durable formaldehyde-free flame retardant cellulosic material, comprising curing a cellulosic material in the presence of an ammonium phosphate and urea, wherein the ammonium phosphate is as defined herein.

In certain embodiments, the cellulosic material comprises cotton, flax, jute, hemp, ramie, lyocell, rayon, or a combination thereof. In certain embodiments, the cellulosic material comprises cotton. In certain embodiments, the cellulosic material comprises flax. In certain embodiments, the cellulosic material comprises jute. In certain embodiments, the cellulosic material comprises hemp. In certain embodiments, the cellulosic material comprises ramie. In certain embodiments, the cellulosic material comprises lyocell. In certain embodiments, the cellulosic material comprises rayon.

In certain embodiments, the cellulosic material is cotton, flax, jute, hemp, ramie, lyocell, rayon, or a combination thereof. In certain embodiments, the cellulosic material is cotton. In certain embodiments, the cellulosic material is flax. In certain embodiments, the cellulosic material is jute. In certain embodiments, the cellulosic material is hemp. In certain embodiments, the cellulosic material is ramie. In certain embodiments, the cellulosic material is lyocell. In certain embodiments, the cellulosic material is rayon.

In certain embodiments, the cellulosic material is a blend of cotton, flax, jute, hemp, ramie, lyocell, rayon, or a combination thereof. In certain embodiments, the cellulosic material is a cotton blend.

In certain embodiments, the curing step is performed at a temperature ranging from about 100 to about 250° C., from about 110 to about 250° C., from about 120 to about 250° C., from about 130 to about 250° C., or from about 130 to about 200° C. In certain embodiments, the curing step is performed at a temperature ranging from about 100 to about 250° C. In certain embodiments, the curing step is performed at a temperature ranging from about 110 to about 250° C. In certain embodiments, the curing step is performed at a temperature ranging from about 120 to about 250° C. In certain embodiments, the curing step is performed at a temperature ranging from about 130 to about 250° C. In certain embodiments, the curing step is performed at a temperature ranging from about 130 to about 200° C. In certain embodiments, the curing step is performed at a temperature of about 100, about 110, about 120, about 130, about 140, about 150, about 160, about 170, about 180, about 190, or about 200° C. In certain embodiments, the curing step is performed at a temperature of about 130, about 140, about 150, about 160, about 170, about 180, about 190, or about 200° C.

In certain embodiments, the cellulosic material is treated during the curing step with heat in the amount ranging from about 1000 to about 20,000° C.-seconds, from about 2000 to about 10,000° C.-seconds, from about 3000 to about 10,000° C.-seconds, from about 3500 to about 10,000° C.-seconds, or from about 4000 to about 10,000° C.-seconds, above 130° C. In certain embodiments, the cellulosic material is treated during the curing step with heat in the amount ranging from about 1000 to about 20,000° C.-seconds above 130° C. In certain embodiments, the cellulosic material is treated during the curing step with heat in the amount ranging from about 2000 to about 10,000° C.-seconds above 130° C. In certain embodiments, the cellulosic material is treated during the curing step with heat in the amount ranging from about 3000 to about 10,000° C.-seconds above 130° C. In certain embodiments, the cellulosic material is treated with heat during the curing step in the amount ranging from about 3500 to about 10,000° C.-seconds above 130° C. In certain embodiments, the cellulosic material is treated during the curing step with heat in the amount ranging from about 4000 to about 10,000° C.-seconds above 130° C. In certain embodiments, the cellulosic material is treated during the curing step with heat in the amount of about 3,000, about 3500, about 4000, about 4500, about 5000, about 5500, about 6000, about 6500, about 7000, about 7500, about 8000, about 8500, or about 9000° C.-seconds above 130° C.

In certain embodiments, the curing step is performed at an absolute humidity of no greater than about 20%, no greater than about 15%, no greater than about 10%, no greater than about 5%, no greater than about 2%, or no greater than about 1%.

In still another embodiment, provided herein is a method for preparing a durable formaldehyde-free flame retardant cellulosic material, comprising the steps of:

a) contacting a cellulosic material with a formaldehyde-free flame retardant composition provided herein to form a wet cellulosic material;

b) drying the wet cellulosic material; and c) curing the cellulosic material to form the durable formaldehyde-free flame retardant cellulosic material.

In certain embodiments, the contacting step is performed at a temperature ranging from about 5 to about 100° C., from about 10 to about 100° C., from about 10 to about 50° C., or from about 10 to about 30° C. In certain embodiments, the contacting step is performed at a temperature ranging from about 5 to about 100° C. In certain embodiments, the contacting step is performed at a temperature ranging from about 10 to about 100° C. In certain embodiments, the contacting step is performed at a temperature ranging from about 10 to about 50° C. In certain embodiments, the contacting step is performed at a temperature ranging from about 10 to about 30° C. In certain embodiments, the contacting step is performed at a temperature of about 10, about 15, about 20, about 25, about 30, about 35, about 40, about 45, or about 50° C.

In certain embodiments, the drying step is performed at a temperature ranging from about 25 to about 200° C., from about 50 to about 150° C., or from about 80 to about 120° C. In certain embodiments, the drying step is performed at a temperature ranging from about 25 to about 200° C. In certain embodiments, the drying step is performed at a temperature ranging from about 50 to about 150° C. In certain embodiments, the drying step is performed at a temperature ranging from about 80 to about 120° C. In certain embodiments, the drying step is performed at a temperature of about 50, about 60, about 70, about 80, about 90, about 100, about 110, about 120, about 130, about 140, or about 150° C. In certain embodiments, the drying step is performed at a temperature of about 80, about 85, about 90, about 100, about 105, about 110, about 115, or about 120° C.

Formaldehyde-Free Flame Retardant Cellulosic Materials

In one embodiment, provided herein is a durable formaldehyde-free flame retardant cellulosic material, which is prepared by a method provided herein.

In certain embodiments, the durable formaldehyde-free flame retardant cellulosic material comprises cotton, flax, jute, hemp, ramie, lyocell, rayon, or a combination thereof. In certain embodiments, the durable formaldehyde-free flame retardant cellulosic material comprises cotton. In certain embodiments, the durable formaldehyde-free flame retardant cellulosic material comprises flax. In certain embodiments, the durable formaldehyde-free flame retardant cellulosic material comprises jute. In certain embodiments, the durable formaldehyde-free flame retardant cellulosic material comprises hemp. In certain embodiments, the durable formaldehyde-free flame retardant cellulosic material comprises ramie. In certain embodiments, the durable formaldehyde-free flame retardant cellulosic material comprises lyocell. In certain embodiments, the durable formaldehyde-free flame retardant cellulosic material comprises rayon.

In certain embodiments, the durable formaldehyde-free flame retardant cellulosic material is durable formaldehyde-free flame retardant cotton, durable formaldehyde-free flame retardant flax, durable formaldehyde-free flame retardant jute, durable formaldehyde-free flame retardant hemp, durable formaldehyde-free flame retardant ramie, durable formaldehyde-free flame retardant lyocell, durable formaldehyde-free flame retardant rayon, or a combination thereof. In certain embodiments, the durable formaldehyde-free flame retardant cellulosic material is durable formaldehyde-free flame retardant cotton. In certain embodiments, the durable formaldehyde-free flame retardant cellulosic material is durable formaldehyde-free flame retardant flax. In certain embodiments, the durable formaldehyde-free flame retardant cellulosic material is durable formaldehyde-free flame retardant jute. In certain embodiments, the durable formaldehyde-free flame retardant cellulosic material is durable formaldehyde-free flame retardant hemp. In certain embodiments, the durable formaldehyde-free flame retardant cellulosic material is durable formaldehyde-free flame retardant ramie. In certain embodiments, the durable formaldehyde-free flame retardant cellulosic material is durable formaldehyde-free flame retardant lyocell. In certain embodiments, the durable formaldehyde-free flame retardant cellulosic material is durable formaldehyde-free flame retardant rayon.

In certain embodiments, the durable formaldehyde-free flame retardant cellulosic material is a durable formaldehyde-free flame retardant blend of cotton, flax, jute, hemp, ramie, lyocell, rayon, or a combination thereof. In certain embodiments, the durable formaldehyde-free flame retardant cellulosic material is a durable formaldehyde-free flame retardant cotton blend.

In certain embodiments, the durable formaldehyde-free flame retardant cellulosic material has a phosphorus content ranging from about 0.1% to about 10% by weight, from about 0.5% to about 10% by weight, from about 1% to about 10%, from about 2% to about 10%, from about 1% to about 5%, or from about 2% to about 5% by weight. In certain embodiments, the durable formaldehyde-free flame retardant cellulosic material has a phosphorus content ranging from about 0.1% to about 10% by weight. In certain embodiments, the durable formaldehyde-free flame retardant cellulosic material has a phosphorus content ranging from about 0.5% to about 10% by weight. In certain embodiments, the durable formaldehyde-free flame retardant cellulosic material has a phosphorus content ranging from about 1% to about 10% by weight. In certain embodiments, the durable formaldehyde-free flame retardant cellulosic material has a phosphorus content ranging from about 2% to about 10% by weight. In certain embodiments, the durable formaldehyde-free flame retardant cellulosic material has a phosphorus content ranging from about 1% to about 5% by weight. In certain embodiments, the durable formaldehyde-free flame retardant cellulosic material has a phosphorus content ranging from about 2% to about 5% by weight. In certain embodiments, the durable formaldehyde-free flame retardant cellulosic material has a phosphorus content of about 1, about 1.5, about 2, about 2.5 about 3, about 3.5 about 4, about 4.5, or about 5% by weight. In certain embodiments, the durable formaldehyde-free flame retardant cellulosic material has a phosphorus content of about 2, about 2.5, about 3, about 3.5, about 4, about 4.5, or about 5% by weight.

In certain embodiments, the durable formaldehyde-free flame retardant cellulosic material has a phosphorus content of no less than about 2, no less than about 2.5, no less than about 3, no less than about 3.5, no less than about 4, no less than about 4.5, or no less than about 5% by weight. In certain embodiments, the durable formaldehyde-free flame retardant cellulosic material has a phosphorus content of no less than about 2% by weight. In certain embodiments, the durable formaldehyde-free flame retardant cellulosic material has a phosphorus content of no less than about 2.5% by weight. In certain embodiments, the durable formaldehyde-free flame retardant cellulosic material has a phosphorus content of no less than about 3% by weight. In certain embodiments, the durable formaldehyde-free flame retardant cellulosic material has a phosphorus content of no less than about 3.5% by weight. In certain embodiments, the durable formaldehyde-free flame retardant cellulosic material has a phosphorus content of no less than about 4% by weight. In certain embodiments, the durable formaldehyde-free flame retardant cellulosic material has a phosphorus content of no less than about 4.5% by weight. In certain embodiments, the durable formaldehyde-free flame retardant cellulosic material has a phosphorus content of no less than about 5% by weight.

In certain embodiments, the durable formaldehyde-free flame retardant cellulosic material is formaldehyde-free. In certain embodiments, the durable formaldehyde-free flame retardant cellulosic material has a formaldehyde content of no greater than about 500 ppm, no greater than about 250 ppm, no greater than about 100 ppm, no greater than about 50 ppm, no greater than about 20 ppm, no greater than about 10 ppm, no greater than about 5 ppm, no greater than about 2 ppm, or no greater than about 1 ppm. In certain embodiments, the durable formaldehyde-free flame retardant cellulosic material has a formaldehyde content of no greater than about 500 ppm. In certain embodiments, the durable formaldehyde-free flame retardant cellulosic material has a formaldehyde content of no greater than about 250 ppm. In certain embodiments, the durable formaldehyde-free flame retardant cellulosic material has a formaldehyde content of no greater than about 100 ppm. In certain embodiments, the durable formaldehyde-free flame retardant cellulosic material has a formaldehyde content of no greater than about 50 ppm. In certain embodiments, the durable formaldehyde-free flame retardant cellulosic material has a formaldehyde content of no greater than about 20 ppm. In certain embodiments, the durable formaldehyde-free flame retardant cellulosic material has a formaldehyde content of no greater than about 10 ppm. In certain embodiments, the durable formaldehyde-free flame retardant cellulosic material has a formaldehyde content of no greater than about 5 ppm. In certain embodiments, the durable formaldehyde-free flame retardant cellulosic material has a formaldehyde content of no greater than about 2 ppm. In certain embodiments, the durable formaldehyde-free flame retardant cellulosic material has a formaldehyde content of no greater than about 1 ppm.

In certain embodiments, the durable formaldehyde-free flame retardant cellulosic material passes a bottom vertical ignition test after 10, 25, 50, or 100 launderings. In certain embodiments, the durable formaldehyde-free flame retardant cellulosic material passes a bottom vertical ignition test after 10 launderings. In certain embodiments, the durable formaldehyde-free flame retardant cellulosic material passes a bottom vertical ignition test after 25 launderings. In certain embodiments, the durable formaldehyde-free flame retardant cellulosic material passes a bottom vertical ignition test after 50 launderings. In certain embodiments, the durable formaldehyde-free flame retardant cellulosic material passes a bottom vertical ignition test after 100 launderings.

In certain embodiments, the durable formaldehyde-free flame retardant cellulosic material has a phosphorus content ranging from about 0.1% to about 10% by weight, from about 0.5% to about 10% by weight, from about 1% to about 10%, from about 2% to about 10%, from about 1% to about 5%, or from about 2% to about 5% by weight after 10, 25, 50, or 100 launderings. In certain embodiments, the durable formaldehyde-free flame retardant cellulosic material has a phosphorus content ranging from about 0.1% to about 10% by weight after 10, 25, 50, or 100 launderings. In certain embodiments, the durable formaldehyde-free flame retardant cellulosic material has a phosphorus content ranging from about 0.5% to about 10% by weight after 10, 25, 50, or 100 launderings. In certain embodiments, the durable formaldehyde-free flame retardant cellulosic material has a phosphorus content ranging from about 1% to about 10% by weight after 10, 25, 50, or 100 launderings. In certain embodiments, the durable formaldehyde-free flame retardant cellulosic material has a phosphorus content ranging from about 2% to about 10% by weight after 10, 25, 50, or 100 launderings. In certain embodiments, the durable formaldehyde-free flame retardant cellulosic material has a phosphorus content ranging from about 1% to about 5% by weight after 10, 25, 50, or 100 launderings. In certain embodiments, the durable formaldehyde-free flame retardant cellulosic material has a phosphorus content ranging from about 2% to about 5% by weight after 10, 25, 50, or 100 launderings. In certain embodiments, the durable formaldehyde-free flame retardant cellulosic material has a phosphorus content of about 1, about 1.5, about 2, about 2.5 about 3, about 3.5 about 4, about 4.5, or about 5% by weight after 10, 25, 50, or 100 launderings. In certain embodiments, the durable formaldehyde-free flame retardant cellulosic material has a phosphorus content of about 2, about 2.5, about 3, about 3.5, about 4, about 4.5, or about 5% by weight after 10, 25, 50, or 100 launderings.

In certain embodiments, the durable formaldehyde-free flame retardant cellulosic material has a phosphorus content of no less than about 2, no less than about 2.5, no less than about 3, no less than about 3.5, no less than about 4, no less than about 4.5, or no less than about 5% by weight after 10, 25, 50, or 100 launderings. In certain embodiments, the durable formaldehyde-free flame retardant cellulosic material has a phosphorus content of no less than about 2% by weight after 10, 25, 50, or 100 launderings. In certain embodiments, the durable formaldehyde-free flame retardant cellulosic material has a phosphorus content of no less than about 2.5% by weight after 10, 25, 50, or 100 launderings. In certain embodiments, the durable formaldehyde-free flame retardant cellulosic material has a phosphorus content of no less than about 3% by weight after 10, 25, 50, or 100 launderings. In certain embodiments, the durable formaldehyde-free flame retardant cellulosic material has a phosphorus content of no less than about 3.5% by weight after 10, 25, 50, or 100 launderings. In certain embodiments, the durable formaldehyde-free flame retardant cellulosic material has a phosphorus content of no less than about 4% by weight after 10, 25, 50, or 100 launderings. In certain embodiments, the durable formaldehyde-free flame retardant cellulosic material has a phosphorus content of no less than about 4.5% by weight after 10, 25, 50, or 100 launderings. In certain embodiments, the durable formaldehyde-free flame retardant cellulosic material has a phosphorus content of no less than about 5% by weight after 10, 25, 50, or 100 launderings.

Formaldehyde-Free Flame Retardant Articles

In one embodiment, provided herein is a formaldehyde-free flame-retardant article, comprising formaldehyde-free flame-retardant material provided herein.

In certain embodiments, the formaldehyde-free flame-retardant article is an apparel, apparel fabric, sock, glove, upholstery fabric, airline fabric, auto upholstery fabric, sleepwear, barrier fabric, air filter paper, curtain, sheet, carpet, throw-rug, awning, robe, gown, banner, sign, oven-mitt, or bag.

The disclosure will be further understood by the following non-limiting examples.

EXAMPLES

As used herein, the symbols and conventions used in these processes and examples, regardless of whether a particular abbreviation is specifically defined, are consistent with those used in the contemporary scientific literature, for example, the Journal of the American Chemical Society. Specifically, but without limitation, the following abbreviations may be used in the examples and throughout the specification: g (grams); oz (ounce); m (meter); yd (yard); min (minutes); sec (seconds); % P (phosphorus content in percentage by weight); APP (ammonium polyphosphate); DAP (diammonium orthophosphate, diammonium hydrogen orthophosphate, diammonium phosphate, or diammonium hydrogen-phosphoate, or $(NH_4)_2HPO_4$); and DMDHEU (dimethylol dihydroxyethyleneurea).

For all of the following examples, unless otherwise indicated, all temperatures are expressed in ° C. (degrees Centigrade). All processes conducted at room temperature unless otherwise noted. Processes illustrated herein are intended to exemplify the applicable chemistry through the use of specific examples and are not indicative of the scope of the disclosure.

Example 1

An experiment was conducted to determine the amount of heat (Degree (C.)-Seconds) required to "fix" an ammonium salt of a flame retardant acid, e.g., ammonium polyphosphate, via phosphorylation to cellulose. The minimum curing temperature chosen was 130° C., at which temperature urea melts, decomposes, and/or reacts with water to form ammonia and carbon dioxide. In the experiment, seventeen samples of a 240 g/m$^2$ (7 oz/yd$^2$) twill 100% cotton fabric were finished with a flame retardant composition containing about 15% ammonium polyphosphate (APP), 20% urea, and 0.5% tauramine oxide (e.g., MACAT® AQ-12; Mason Chemical Company, Arlington Heights, Ill.) in water. Wet pickup was about 72% by weight. The wet samples were heated at various temperatures for various times. The temperature of the fabric of each sample was determined every 5 seconds using an infrared temperature measuring device while the sample was in the oven.

After the samples were cured, the treated samples were scoured in boiling water for about 15 min. The dry flame retardant solids weight gains were determined for each sample and the samples were also analyzed for their phosphorus contents using an X-ray instrument. Analytical results of the samples are shown in Table 1, along with their calculated phosphorus contents.

TABLE 1

| Sample No. | % P (X-ray) | ° C.-Sec | % P (Cal.) |
|---|---|---|---|
| 1 | 0.62 | 600 | 0.38 |
| 2 | 0.96 | 1200 | 0.80 |
| 3 | 1.22 | 1800 | 1.04 |
| 4 | 1.78 | 3000 | 1.66 |
| 5 | 1.08 | 1600 | 0.90 |
| 6 | 1.58 | 2400 | 1.46 |
| 7 | 1.90 | 3600 | 1.72 |
| 8 | 2.39 | 6000 | 2.42 |
| 9 | 2.21 | 3450 | 2.06 |
| 10 | 2.32 | 5100 | 2.24 |
| 11 | 2.49 | 5400 | 2.53 |
| 12 | 2.56 | 4080 | 2.41 |
| 13 | 2.55 | 5000 | 2.56 |
| 14 | 2.50 | 4800 | 2.53 |
| 15 | 2.53 | 4000 | 2.40 |
| 16 | 2.55 | 4850 | 2.57 |
| 17 | 2.66 | 7800 | 2.72 |

Without being limited by any theory, the phosphorus contents of the samples were also calculated based on dry add-on measurements assuming that the product of the reaction of APP with cellulose has the structure of cellulose-[O—P(O)(ONH$_4$)—O—P(O)(ONH$_4$)—O—P(O)(ONH$_4$)$_2$]$_n$. As shown in Table 1, there is good agreement between the phosphorus contents determined with an X-ray instrument (% P(X-ray)) and the phosphorus contents calculated (% P(Cal.)).

From a time-temperature profile obtained during the curing process, the heat exposure [degree (C.)-seconds] at 130° C. and above was obtained by integration, with the assumption that there is a minimum of reaction taking place until the temperature reaches about 130° C., at which point the urea begins to decompose.

From a plot of the "Degree (C.)-second versus % P(fixed)," it is estimated that the heat exposure needs to be about 4000° (C.)-seconds or above before all of the phosphorus is fixed. Thus, the amount of heat for fixing phosphorus to cellulose can be calculated using the formula of Degree (° C.)-seconds=(Temperature (° C.)−130)×(Time (seconds)). Some temperatures and times that produce a constant heat exposure of 4,000° (C.)-seconds are shown in Table 2.

TABLE 2

| Heat Exposure (° C.-sec) | Temperature (° C.) | Time (sec.) |
|---|---|---|
| 4000 | 150 | 200 |
| 4000 | 160 | 133 |
| 4000 | 170 | 100 |
| 4000 | 180 | 80 |
| 4000 | 190 | 66 |

In addition to the X-ray method for determining the fixation of phosphorus after scouring, another method is to dye a small swatch with a dye, such as a cotton type of dye (e.g., Direct Dye). For example, a red dye solution was prepared by dissolving Alaco Direct Red BWS in water, which contained about 0.5% of the dye and about 15% of NaCl. Small samples of the flame-retardant material treated samples and controls were placed in the red dye solution and heated to boiling for about 2 min and then rinsed. The flame-retardant samples were still white with no indication of being dyed red. The controls were red in color after a though rinse in hot water. This staining or dyeing is a quick quality control check concerning the fixation of a flame-retardant material. If the flame-retardant material is fixed, then the material will not accept any dyestuff.

Example 2

Two lots of a formaldehyde-free flame retardant composition, which contained (i) 35% by weight of an aqueous PT13 solution containing 50% by weight of solid APP with a phosphorus content of 13.0%, (ii) 25% by weight of urea, and (iii) 0.1% MACAT® AQ-12 wetting agent, were applied to a 240 g/m$^2$ (7.0 oz/yd$^2$) cotton twill fabric. The samples were dried, and then cured or baked at 170° C. for 180 seconds. Analytical results of the treated samples are summarized in Table 3, wherein the phosphorus contents were determined using X-ray techniques. The formaldehyde-free flame retardant composition has good reproducibility and the flame retardant fabrics thus produced has good durability to scouring.

Example 3

A formaldehyde-free flame retardant composition, which contained (i) 25% by weight of an aqueous PT-13 solution containing 50% by weight of solid APP with a phosphorus content of 13.0%, (ii) 20% by weight of urea, and (iii) 0.2% MACAT® AQ-12 wetting agent, and (iv) had a pH of 7.8, was applied to a 233 g/m$^2$ 3×1 cotton twill fabric. The sample was dried and then cured at 160° C. for 120 sec. Analytical results of the treated sample are summarized in Table 4. The calculated % P(analytical) of 1.94% compares very well with % P(X-ray) value of 1.92% after curing. Also the finished sample was durable to scouring (1.92% versus 1.93% P (scoured)). The fixation was very good.

Example 4

A formaldehyde-free flame retardant composition, which contained (i) 40% by weight of an aqueous DAP solution containing 85% by weight of phosphoric acid (275 g), 25% by weight of an ammonium hydroxide solution (241 g, 15% by weight), and water (45 g), (ii) 35% by weight of urea, and (iii) 25% by weight of water, was applied to a 233 g/m$^2$ 3×1 cotton twill fabric. The sample was pad-dried at 120° C. for 100 sec. and then cured at 155° C. for 360 sec. The sample was then washed under home laundering conditions, AATCC 135, 49° C., machine wash, tumble dry, to determine its durability, and the phosphorus contents were determined after washing. The analytical results are summarized in Table 5. The formaldehyde content of the finished sample was determined to be <20 ppm (JIS L1041).

TABLE 3

|  | Lot #1 | Lot #2 |
| --- | --- | --- |
| Wet fabric weight (g) | 55.90 | 56.23 |
| Dry fabric weight (g) | 30.38 | 30.32 |
| % Wet pick-up | 84.0 | 85.5 |
| Bone dry weight (g) | 28.86 | 28.80 |
| Dry only weight (g) | 40.02 | 40.03 |
| % Add-on dry only | 38.78 | 39.0 |
| Cured weight (g) | 34.01 | 35.46 |
| % Add-on after cure | 17.8 | 23.1 |
| After scour weight (g) | 33.08 | 32.80 |
| % Dry add-on | 14.6 | 13.9 |
| % P (face, dry only) | 2.66 | 2.78 |

TABLE 3-continued

|  | Lot #1 | Lot #2 |
| --- | --- | --- |
| % P (back, dry only) | 2.69 | 2.91 |
| % (Ave.) | 2.68 | 2.84 |
| % P (face, cured) | 3.04 | 3.15 |
| % P (back, cured) | 3.12 | 3.24 |
| % (Ave.) | 3.08 | 3.19 |
| % P (face, scoured) | 2.73 | 2.78 |
| % P (back, scoured) | 2.92 | 2.88 |
| % (Ave.) | 2.82 | 2.84 |

TABLE 4

| Wet weight (g) | 54.43 |
| --- | --- |
| Dry weight (g) | 33.58 |
| Wet pick-up (%) | 74.2 |
| Bone dry weight (g) | 29.69 |
| Cured weight (g) | 32.52 |
| Total dry add-on (%) | 9.53 |
| Scoured weight (g) | 31.76 |
| Fixed add-on (%) | 6.97 |
| % P (X-ray, face) | 1.82 |
| % P (X-ray, back) | 2.02 |
| % P (Ave.) | 1.92 |
| % P (X-ray, face, scoured) | 1.79 |
| % P (X-ray, back, scoured) | 2.07 |
| % P (Ave.) | 1.93 |
| Phosphorus add-on | 2.41% |
| Dry add-on of PT-13 | 9.25% |
| Dry add-on of urea | 14.8% |
| Total dry add-on | 24.1% |
| % P (Analytical) | 1.94 |

TABLE 5

|  | Phosphorous Content (%) | Char Length (cm)$^a$ |
| --- | --- | --- |
| Before wash | 2.51 | 5.5 |
| After 1 wash | 2.55 | 6.8 |
| After 5 washes | 2.31 | 7.0 |
| After 10 washes | 2.30 | 6.5 |
| After 15 washes | 2.36 | 8.0 |
| After 20 washes | 2.21 | 6.8 |
| After 25 washes | 2.04 | 6.3 |
| After 30 washes | 2.10 | Burned |

$^a$Char length was determined using 12 second bottom vertical ignition test.

Example 5

A formaldehyde-free flame retardant composition, which contained (i) 24% by weight of an aqueous PT-13 solution containing 50% by weight of solid APP with a phosphorus content of 13.0%, (ii) 24% by weight of urea, and (iii) 0.1% MACAT® AQ-12 wetting agent, was applied to a dyed (pink) inter-lock 100% cotton knit fabric (children sleepwear). The wet pickup was 95%. The treated knit sample was dried at 130° C. to just dry, and then baked or heated at 177° C. for 180 sec. Color was only slightly affected and the hand was very good. As shown in Table 6, the phosphorus content of the finished sample was 2.09% and the phosphorus content after scouring in warm (120° C.) water was 1.99%.

TABLE 6

|  | Phosphorous Content | Char Length (cm)[a] |
|---|---|---|
| Before scouring | 2.09 | 1.4 |
| After scouring | 1.99 | 5.4 |

[a] Char length was determined using 3 second bottom vertical ignition test.

Example 6

A formaldehyde-free flame retardant composition, which contained (i) 35% by weight of an aqueous PT-13 solution containing 50% by weight of solid APP with a phosphorus content of 13.0%, (ii) 25% by weight of urea, and (iii) 0.1% MACAT® AQ-12 wetting agent, was applied to a rayon stitch bonded fabric (barrier fabric: 188 g/m$^2$).

The wet pickup was 135%. The treated sample was dried at 110° C. and then baked or heated at 175° C. for 180 sec. The phosphorus contents of the treated sample are summarized in Table 7. The finished sample passed the 603B screening test for a flame barrier for mattress ticking (FTM 1633).

TABLE 7

|  | Phosphorous Content (%) |
|---|---|
| Before scouring | |
| % P (face) | 3.57 |
| % P (back) | 3.45 |
| % P (Ave.) | 3.50 |
| After scoured at 120 C. | |
| % P (face) | 3.14 |
| % P (back) | 3.42 |
| % P (Ave.) | 3.28 |

Example 7

A sample of a high loft needle punched cotton non-woven fabric (barrier fabric) (150 g/m$^2$ or 4.5 oz/yd$^2$) was finished with a formaldehyde-free flame retardant composition, which contained (i) 20% by weight of an aqueous solution containing 50% by weight of solid APP, (ii) 20% by weight of urea, and (iii) 0.1% MACAT® AQ-12 wetting agent. The wet pickup was 88%. Analytical results of the treated sample are summarized in Table 8. The finished sample passed the 603B screening test for a flame barrier for mattress ticking (FTM 1633). The treated sample was dried at 110° C. and then baked or heated at 175° C. for 180 sec.

TABLE 8

| % P Add-on calculated | 2.82 |
|---|---|
| % P (Analytical) (calculated from wet pick-up) | 2.54 |
| % P (X-ray) | 2.53 |

Example 8

A formaldehyde-free flame retardant composition, which contained (i) 30% by weight of an aqueous PT-13 solution containing 50% by weight of solid APP with a phosphorus content of 13.0%, (ii) 30% by weight of urea, (iii) 6.0% by weight of dicyandiamide, and (iv) 0.5% MACAT® AQ-12 wetting agent, was applied to both dyed and non-dyed twill cotton fabrics (240 g/m$^2$ or 7.0 oz/yd$^2$). Analytical results of the treated samples are summarized in Table 9. The treated sample was dried at 110° C. and then baked or heated at 175° C. for 180 sec. There was a minimum of color change observed.

TABLE 9

|  | White | Brown |
|---|---|---|
| Wet weight (g) | 36.30 | 31.47 |
| Dry weight (g) | 20.35 | 17.79 |
| Wet pickup (%) | 78.4 | 78.9 |
| Bone dry weight (g) | 19.35 | 16.91 |
| Cured weight (g) | 24.43 | 21.51 |
| Add-on (cured) (%) | 26.2 | 27.2 |
| Scoured weight (g) | 22.04 | 19.17 |
| Add-on (scoured) (%) | 14.0 | 13.4 |
| % P (add-on) | 3.17 | 3.11 |
| % P (Analytical, cured, cal.) | 2.51 | 2.44 |
| % P (X-ray) (cured) | 2.78 | 2.74 |
| % P (scoured) | 2.41 | 2.54 |

Example 9

A twill cotton fabric (310 g/m$^2$ or 9.0 oz/yd$^2$) was (1) treated with a 40% APP solution and then pad-dried at 120° C. for 120 sec.; (2) treated with a 30% urea solution, pad-tried at 120° C. for 120 sec., and baked at 160° C. for 360 sec.; and (3) optionally treated with a glyoxal solution containing modified DMDHEU (50 g/L, 45% by weight, BASF), magnesium chloride (7.5 g/L), citric acid (50%, 0.6 g/L), and polyethylene (30 g/L, 35% by weight), pad-tried at 120° C. for 120 sec., and baked at 150° C. for 200 sec. Analytical results of the treated fabric are summarized in Tables 10 and 11.

TABLE 10

|  | Tensile Strength (ASTM D5034) (lbs) | Tear Strength (ASTM D1424) (lbs) | Flex Abrasion (ASTM D3885) (cycles) | Formaldehyde (JIS L1041) (ppm) |
|---|---|---|---|---|
| Before finishing | 213.3 × 121.9 | 5.6 × 4.6 | 300 × 370 | |
| Steps 1 + 2 | 160.2 × 64.6 | 2.7 × 1.7 | 400 × 230 | 0 |
| Steps 1 + 2 + 3 | 134.4 × 57.5 | 5.3 × 3.5 | 153 × 280 | 172 |
| Step 3 | 110 × 64.8 | 7.6 × 5.9 | 610 × 670 | |

TABLE 11

| | Wash[a] | | | | | |
|---|---|---|---|---|---|---|
| | Before wash | After 10 washes | After 20 washes | After 30 washes | After 40 washes | After 50 washes |
| Char length[b] (cm) | 6 | 6 | 3.5 | 5 | 4.7 | 5.2 |

[a]Washing was performed according to AATCC 135, home laundry, tumble dry.
[b]Char length was determined according to ASTM D6413.

Example 10

A formaldehyde-free flame retardant composition, which contained (i) 40% by weight of APP and (ii) 35% by weight of urea was applied to a cellulosic material. The treated sample was dried at 80 to 120° C. and then cured at 140° C. for 360 sec.

The finished sample was washed under home laundering conditions, AATCC 135, 49° C., machine wash, tumble dry, to determine its durability, and the phosphorus contents were also determined after washing. The analytical results are summarized in Table 12. The formaldehyde content of the finished sample was determined to be <20 ppm (JIS L1041).

TABLE 12

| | Phosphorous Content (%) | Char Length (cm) |
|---|---|---|
| Before | 2.6 | 5.8 |
| After 1 wash | 2.6 | 5.9 |
| After 5 washes | 2.6 | 6.1 |
| After 10 washes | 2.5 | 5.9 |
| After 15 washes | 2.5 | 6.0 |
| After 20 washes | 2.4 | 6.2 |
| After 25 washes | 2.4 | 6.3 |

The examples set forth above are provided to give those of ordinary skill in the art with a complete disclosure and description of how to make and use the claimed embodiments, and are not intended to limit the scope of what is disclosed herein. Modifications that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. A method for preparing a durable formaldehyde-free flame retardant fabric material, consisting of the step of curing a fabric material in the presence of a formaldehyde-free flame retardant composition with heat in the amount ranging from about 3,000 to about 20,000° C.-seconds above 130° C.; wherein the formaldehyde-free flame retardant composition consists of: (i) from about 30% to about 50% by weight of an ammonium salt of a phosphorus containing acid, where the ammonium salt of a phosphorus containing acid is diammonium orthophosphate or an ammonium polyphosphate, (ii) urea, (iii) water, and (iv) optionally from about 0.1% to about 5% by weight of one or more chemicals selected from the group consisting of lauramine oxide, dyes, wrinkle resist agents, foaming agents, buffers, pH stabilizers, stain repellants, fluorocarbons, stain blocking agents, soil repellants, wetting agents, softeners, water repellants, stain release agents, optical brighteners, emulsifiers, surfactants, and mixtures thereof; wherein the durable formaldehyde-free flame retardant fabric material passes a bottom vertical ignition test after 50 launderings; and wherein the bottom vertical ignition test is performed according to the ASTM D6413 test method and the launderings are performed according to the AATCC 135 test method.

2. The method of claim 1, wherein the ammonium salt of the phosphorus containing acid is diammonium orthophosphate.

3. The method of claim 1, wherein the ammonium salt of the phosphorus containing acid is an ammonium polyphosphate.

4. The method of claim 1, wherein the formaldehyde-free flame retardant composition has a formaldehyde content of no greater than 50 ppm.

5. The method of claim 1, wherein the formaldehyde-free flame retardant composition contains from about 35% to about 50% by weight of the ammonium salt of the phosphorus containing acid.

6. The method of claim 1, wherein the formaldehyde-free flame retardant composition contains from about 5% to about 50% by weight of urea.

7. The method of claim 1, wherein the formaldehyde-free flame retardant composition contains from about 35% to about 50% by weight of diammonium orthophosphate and from about 20% to about 50% by weight of urea.

8. The method of claim 1, wherein the formaldehyde-free flame retardant composition contains from about 35% to about 50% by weight of an ammonium polyphosphate and from about 20% to about 50% by weight of urea.

9. The method of claim 1, wherein the curing step is performed at a temperature ranging from about 130 to about 200° C.

10. The method of claim 1, wherein the fabric material is treated during the curing step with heat in the amount ranging from about 4,000 to about 10,000° C.-seconds above 130° C.

11. The method of claim 1, wherein the fabric material comprises cotton, flax, jute, hemp, ramie, lyocell, rayon, or a combination thereof.

12. The method of claim 1, wherein the fabric material comprises cotton.

13. The method of claim 1, wherein the fabric material is a cotton blend.

14. The method of claim 1, wherein the formaldehyde-free flame retardant composition contains from about 30% to about 35% by weight of urea.

15. The method of claim 1, wherein the formaldehyde-free flame retardant composition contains from about 40% by weight of the ammonium salt of the phosphorus containing acid.

16. The method of claim 1, wherein the formaldehyde-free flame retardant composition consists of: (i) from about 30% to about 50% by weight of an ammonium salt of a phosphorus containing acid, where the ammonium salt of a phosphorus containing acid is diammonium orthophosphate or an ammonium polyphosphate, (ii) urea, (iii) water, and (iv) optionally one or more chemicals selected from the group consisting of lauramine oxide, dyes, buffers, wetting agents, and mixtures thereof.

17. The method of claim 15, wherein the formaldehyde-free flame retardant composition contains from about 30% to about 35% by weight of urea.

18. The method of claim 15, wherein the ammonium salt of the phosphorus containing acid is diammonium orthophosphate.

19. The method of claim 18, wherein the formaldehyde-free flame retardant composition contains about 30% by weight of urea.

20. The method of claim 15, wherein the ammonium salt of the phosphorus containing acid is an ammonium polyphosphate.

21. The method of claim 20, wherein the formaldehyde-free flame retardant composition contains about 35% by weight of urea.

22. A method for preparing a durable formaldehyde-free flame retardant fabric material, consisting of the steps of:
    a) contacting a fabric material with a formaldehyde-free flame retardant composition to form a wet fabric material; wherein the formaldehyde-free flame retardant composition consists of:
        (i) from about 30% to about 50% by weight of an ammonium salt of a phosphorus containing acid, where the ammonium salt of a phosphorus containing acid is diammonium orthophosphate or an ammonium polyphosphate,
        (ii) urea,
        (iii) water, and
        (iv) optionally from about 0.1% to about 5% by weight of one or more chemicals selected from the group consisting of lauramine oxide, dyes, wrinkle resist agents, foaming agents, buffers, pH stabilizers, stain repellants, fluorocarbons, stain blocking agents, soil repellants, wetting agents, softeners, water repellants, stain release agents, optical brighteners, emulsifiers, surfactants, and mixtures thereof;
    b) drying the wet fabric material; and
    c) curing the fabric material with heat in the amount ranging from about 3,000 to about 20,000° C.-seconds above 130° C. to form the durable formaldehyde-free flame retardant fabric material;
    wherein the durable formaldehyde-free flame retardant fabric material passes a bottom vertical ignition test after 50 launderings; and wherein the bottom vertical ignition test is performed according to the ASTM D6413 test method and the launderings are performed according to the AATCC 135 test method.

23. The method of claim 22, wherein the drying step is performed at a temperature ranging from about 50 to about 150° C.

24. The method of claim 22, wherein the curing step is performed at a temperature ranging from about 130 to about 200° C.

25. The method of claim 22, wherein the fabric material comprises cotton, flax, jute, hemp, ramie, lyocell, rayon, or a combination thereof.

26. The method of claim 22, wherein the formaldehyde-free flame retardant composition contains from about 40% by weight of the ammonium salt of the phosphorus containing acid.

27. The method of claim 22, wherein the formaldehyde-free flame retardant composition consists of: (i) from about 30% to about 50% by weight of an ammonium salt of a phosphorus containing acid, where the ammonium salt of a phosphorus containing acid is diammonium orthophosphate or an ammonium polyphosphate, (ii) urea, (iii) water, and (iv) optionally one or more chemicals selected from the group consisting of lauramine oxide, dyes, buffers, wetting agents, and mixtures thereof.

28. The method of claim 22, wherein the formaldehyde-free flame retardant composition contains from about 30% to about 35% by weight of urea.

29. The method of claim 28, wherein the formaldehyde-free flame retardant composition contains about 30% by weight of urea.

30. The method of claim 28, wherein the formaldehyde-free flame retardant composition contains about 35% by weight of urea.

\* \* \* \* \*